(12) United States Patent
Shah et al.

(10) Patent No.: US 11,493,706 B2
(45) Date of Patent: *Nov. 8, 2022

(54) MULTI-SPEED TRANSCEIVER SYSTEM

(71) Applicant: Dell Products L.P., Round Rock, TX (US)

(72) Inventors: Maunish Shah, Austin, TX (US); Shree Rathinasamy, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 34 days.

This patent is subject to a terminal disclaimer.

(21) Appl. No.: 17/179,689

(22) Filed: Feb. 19, 2021

(65) Prior Publication Data

US 2022/0269008 A1 Aug. 25, 2022

(51) Int. Cl.
| | |
|---|---|
| G02B 6/42 | (2006.01) |
| G02B 6/35 | (2006.01) |
| G02B 6/12 | (2006.01) |
| H04B 10/40 | (2013.01) |
| H04B 10/516 | (2013.01) |

(52) U.S. Cl.
CPC ............ G02B 6/4246 (2013.01); G02B 6/12 (2013.01); G02B 6/3562 (2013.01); H04B 10/40 (2013.01); H04B 10/5161 (2013.01); *G02B 6/421* (2013.01); *G02B 2006/12142* (2013.01); *G02B 2006/12145* (2013.01)

(58) Field of Classification Search
None
See application file for complete search history.

(56) References Cited

U.S. PATENT DOCUMENTS

| | | | | |
|---|---|---|---|---|
| 10,396,899 B1* | 8/2019 | Kim | ................... | H04B 10/541 |
| 11,251,872 B1* | 2/2022 | Rathinasamy | ....... | H04B 10/278 |
| 2004/0105410 A1* | 6/2004 | Fujimori | ............ | H03H 11/1291 |
| | | | | 370/335 |
| 2005/0213982 A1* | 9/2005 | Weber | ................... | H04B 10/801 |
| | | | | 398/135 |
| 2014/0156879 A1* | 6/2014 | Wong | .................. | G06F 11/3055 |
| | | | | 710/19 |
| 2016/0105236 A1* | 4/2016 | Zhang | .................... | H04B 10/61 |
| | | | | 398/140 |

* cited by examiner

*Primary Examiner* — Jerry Rahll
(74) *Attorney, Agent, or Firm* — Joseph Mencher

(57) ABSTRACT

A multi-speed transceiver device includes a chassis having an optical cable connector coupled to a transceiver processor, and an optical waveguide coupling. A data receiving subsystem in the chassis couples the transceiver processor to the optical waveguide coupling, includes data receiving optical waveguides, and transmits first data received from the transceiver processor to the optical waveguide coupling over a number of the data receiving optical waveguides that depends on a first data transmission speed at which the first data was received. A data transmission subsystem in the chassis couples the transceiver processor to the optical waveguide coupling, includes data transmission optical waveguides, and receives second data via the optical waveguide coupling and over a number of the data transmission optical waveguides that depends on a second data transmission speed at which the second data was received, and then transmits that second data to the transceiver processor.

20 Claims, 21 Drawing Sheets

MULTI-SPEED TRANSCEIVER SYSTEM

BACKGROUND

The present disclosure relates generally to information handling systems, and more particularly to a transceiver device that may operate to transmit and receive data for attached information handling systems at multiple different data transmission speeds.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, switch devices and server devices, are sometimes connected together using transceiver devices. For example, server devices often include Network Interface Controller (NIC) devices, Converged Network Adapter (CNA) devices, and/or other device coupling subsystems that couple the server device to port(s) on one or more switch devices (e.g., Top Of Rack (TOR) switch devices), and transceiver devices are often utilized to couple the server device and the switch device(s) by connecting transceiver devices to each of the switch device and the server device(s), and connecting a cable between those transceiver devices. However, the ports on the switch device(s) may operate to transmit data at different data transmission speeds (and may be configurable to change the data transmission speed at which they operate), which requires the transceiver devices connected to those ports to operate at the corresponding data transmission speed of its connected port. As will be appreciated by one of skill in the art, conventional transceiver devices are statically configured to operate at a particular data transmission speed, and typically include a particular form factor and connection interfaces to support that data transmission speed, which can raise some issues.

For example, the static data transmission speed configurations of conventional transceiver devices result in a variety of transceiver devices/form factors/connection interfaces being required for systems that operate at different data transmission speeds (e.g., the form factors/connection interfaces for a 25 GbE transceiver device and a 100 GbE transceiver device are different), which increases costs to users due to the need to have a variety of different transceiver devices available to support different data transmission speeds, as well as the inventory management operations needs to secure and store the different transceiver devices and associating cabling. Furthermore, different transceiver devices configured to operate at different data transmission speeds cannot be swapped with each other (e.g., on the same switch device or different switch devices) due to the different form factors/connection interfaces provided for transceiver devices that operate at different data transmission speeds.

As such, users must understand how the different transceiver devices/form factors may be utilized with different ports, as well as the distances/ranges supported by those different transceiver devices, and the attempted use of a transceiver device with a port that does not support it can result in damage to the port and/or the transceiver device (e.g., a 200 GpE Quad Small Form Factor 28-Double Density (QSFP28-DD) transceiver device is longer than a 100 GbE QSFP28 transceiver device, and an attempt to insert a 200 GbE QSFP28-DD transceiver device into a 100 GbE port can damage the 200 GbE QSFP28-DD transceiver device and/or the 100 GbE port). Furthermore, when ports are frequently modified to operate at different data transmission speeds, the transceiver devices used with those ports must be frequently switched, which can cause wear on the transceiver devices and sometimes result in damage or failure of the transceiver devices. Further still, transceiver devices removed from a device are often stored in Electro-Static Discharge (ESD) containers that are provided in different sizes for different form factor transceiver devices, and those ESD containers can be damaged if a user attempts to store the wrong sized transceiver device in that ESD container.

Accordingly, it would be desirable to provide a transceiver device system that addresses the issues discussed above.

SUMMARY

According to one embodiment, an Information Handling System (IHS) includes a first device that includes: a first device optical waveguide coupling; and a first device data transmission subsystem that is coupled to the first device optical waveguide coupling, wherein the first device data transmission subsystem includes a plurality of first device data transmission optical waveguides and is configured to transmit first data to the first device waveguide coupling over a number of the plurality of first device data transmission optical waveguides that depends on a first data transmission speed at which the first data is transmitted; and a transceiver device that includes: a transceiver device optical waveguide coupling that is connected to the first device optical waveguide coupling; and a transceiver device data transmission subsystem that is coupled to the transceiver device optical waveguide coupling, wherein the transceiver device data transmission subsystem includes a plurality of transceiver device data transmission optical waveguides and is configured to receive the first data via the transceiver device optical waveguide coupling from the first device and over a number of the plurality of transceiver device data transmission optical waveguides that depends on the first data transmission speed at which the first data was received.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
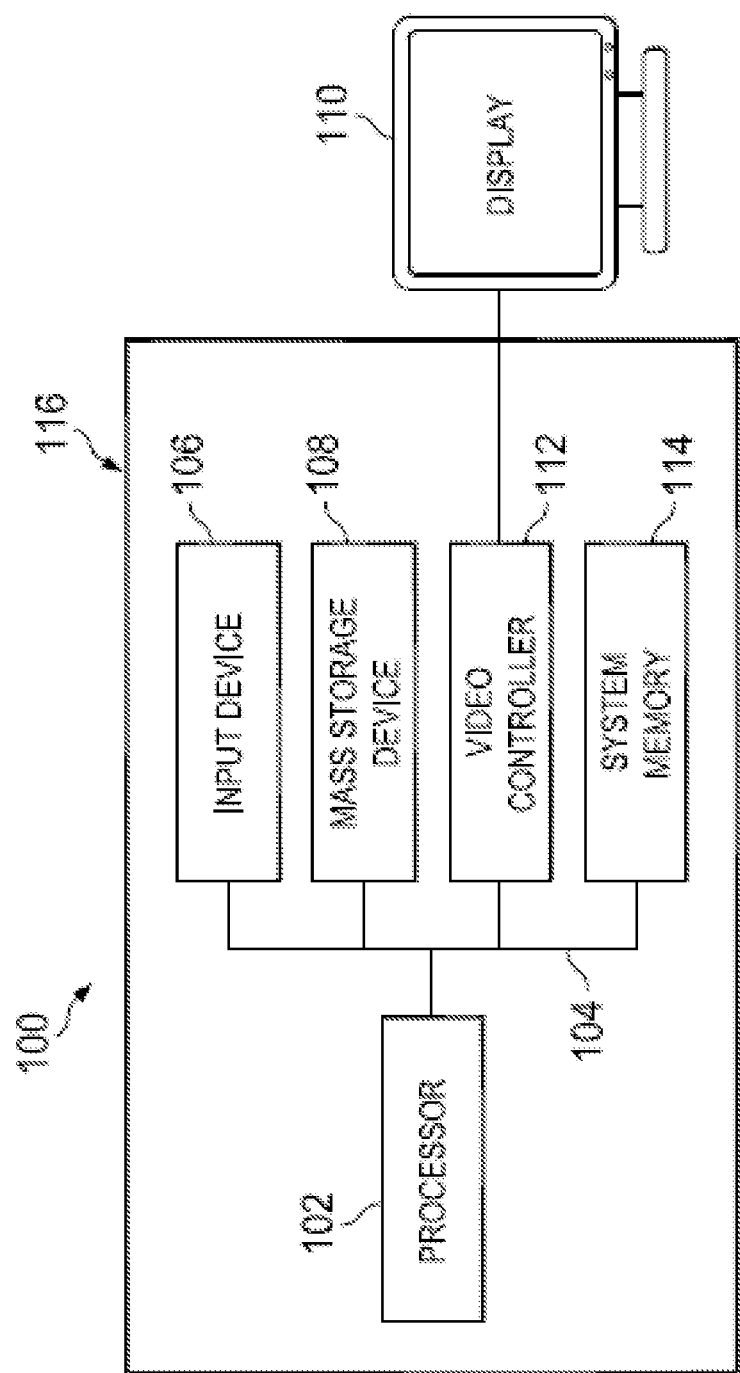
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
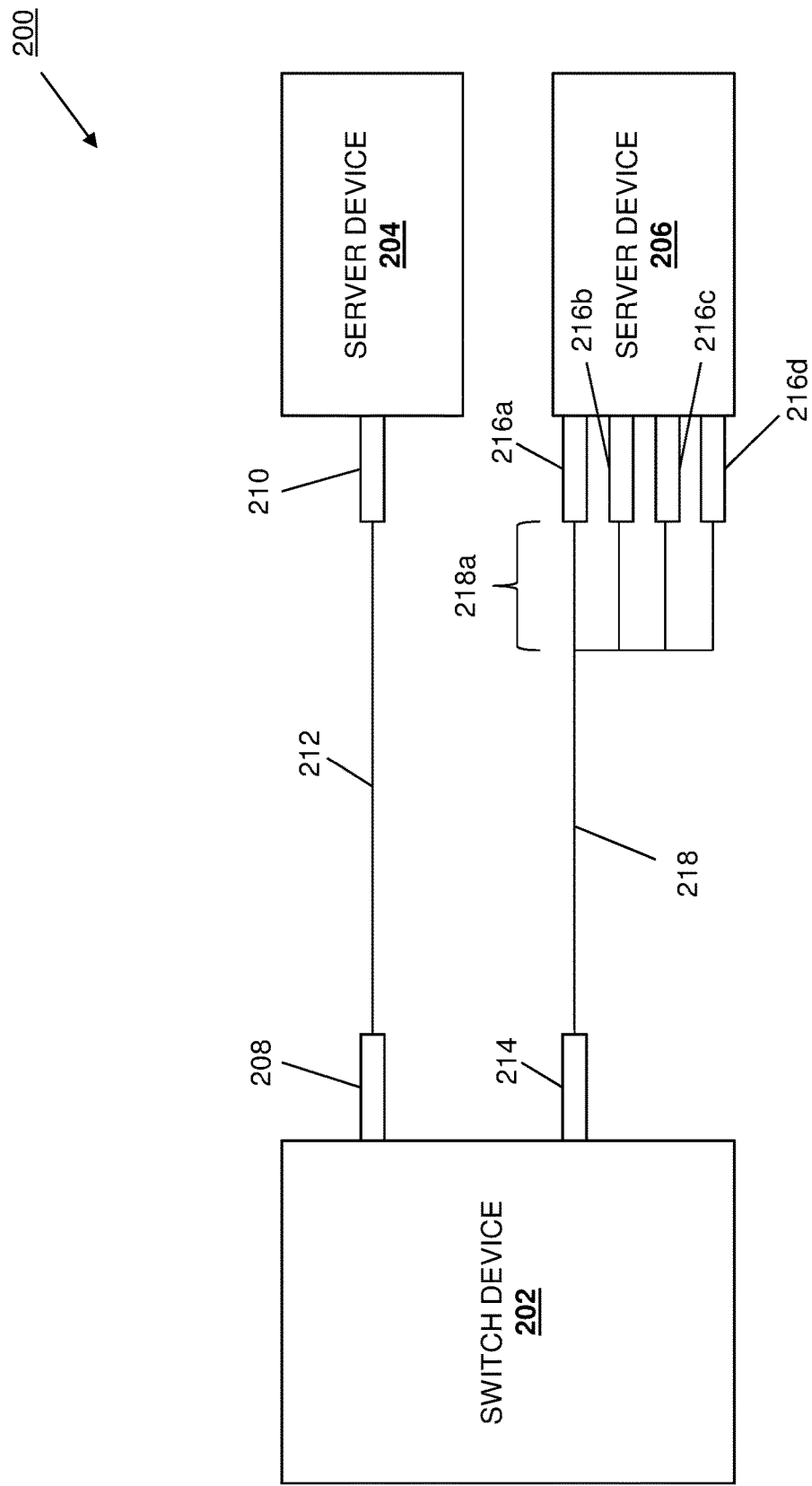
FIG. 2 is a schematic view illustrating an embodiment of a networked system.

Referring now to FIG. 2, an embodiment of a networked system 200 is illustrated. In the illustrated embodiment, the networked system 200 includes a switch device 202 and a pair of server devices 204 and 206. In an embodiment, any or all of the switch device 202 and the server devices 204 and 206 may be provided by the IHS 100 discussed above with reference to FIG. 1, and/or may include some or all of the components of the IHS 100, and in specific examples may include a TOR switch device and server devices included in a rack. However, while illustrated and discussed as being provided by particular devices, one of skill in the art in possession of the present disclosure will recognize that a variety of devices may be provided in the networked system 200 and coupled together via the transceiver devices of the present disclosure while remaining within the scope of the present disclosure. In the illustrated embodiment, a multi-speed transceiver device 208 provided according to the teachings of the present disclosure is connected to the switch device 202, a multi-speed transceiver device 210 provided according to the teachings of the present disclosure is connected to the server device 204, and a cable 212 is connected to each of the multi-speed transceiver devices 208 and 210. The illustrated embodiment also includes a multi-speed transceiver device 214 provided according to the teachings of the present disclosure and connected to the switch device 202, and multi-speed transceiver devices 216a, 216b, 216c, and 216d provided according to the teachings of the present disclosure and connected to the server device 204, with a cable 218 connected to the multi-speed transceiver device 214, and a cable breakout portion 218a of the cable connected to the multi-speed transceiver devices 216a-216d. However, while a specific networked system 200 has been illustrated and described, one of skill in the art in possession of the present disclosure will recognize that the networked system of the present disclosure may include a variety of components and component configurations while remaining within the scope of the present disclosure as well.

Figure 3:
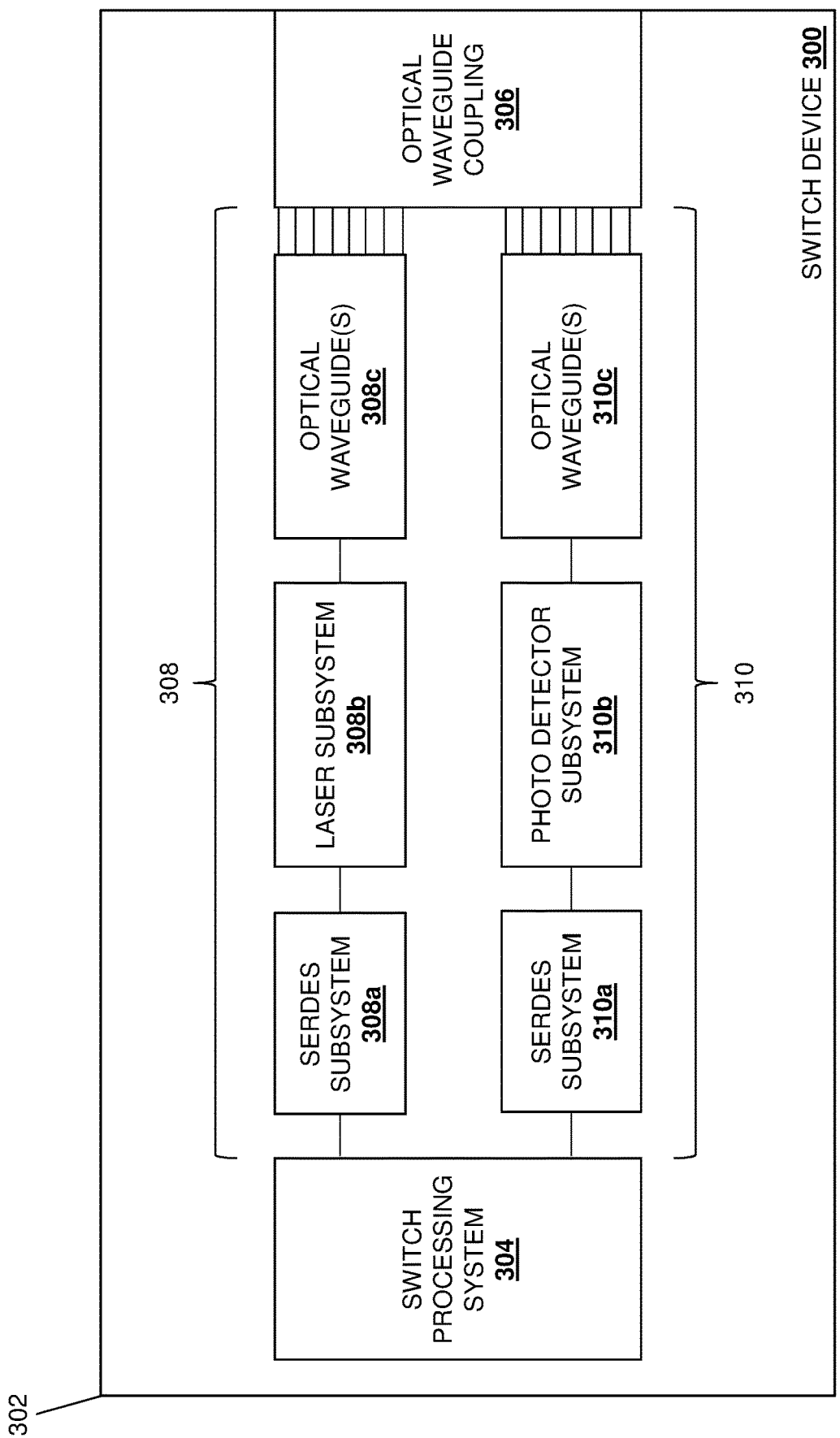
FIG. 3 is a schematic view illustrating an embodiment of a switch device that may be included in the networked system of FIG. 2.

Referring now to FIG. 3, an embodiment of a switch device 300 is illustrated that may provide the switch device 202 discussed above with reference to FIG. 2. As such, the switch device 300 may be provided by the IHS 100 discussed above with reference to FIG. 1 and/or may include some or all of the components of the IHS 100, and in specific examples may be provided by a TOR switch device. Furthermore, while illustrated and discussed as being provided by a switch device, one of skill in the art in possession of the present disclosure will recognize that the components and/or functionality of the switch device 300 discussed below are also provided in the server devices 204 and 206 to enable similarly data transmission operations, and/or may be provided in a variety of other devices to configure those devices to operate similarly as the switch device 202 discussed below. In the illustrated embodiment, the switch device 300 includes a chassis 302 that houses the components of the switch device 300, only some of which are illustrated below. For example, the chassis 302 may house a switch processing system 304 (which may include the processor 102 discussed above with reference to FIG. 1) and a memory system (not illustrated, but which may include the memory 114 discussed above with reference to FIG. 1) that is coupled to the switch processing system 304 and that includes instructions that, when executed by the switch processing system 304, cause the switch processing system 304 to perform any of the functionality of the switch devices discussed below.

The chassis 302 also includes an optical waveguide coupling 306 that may be accessible on an outer surface of the chassis 302 and that one of skill in the art in possession of the present disclosure will appreciate may include any of a variety of connection and/or securing features in order to connect with and secure to the optical waveguide coupling on the multi-speed transceiver devices of the present disclosure, discussed in further detail below. A data transmission subsystem 308 couples the switch processing system 304 to the optical waveguide coupling 306, and in the illustrated embodiment includes a serializer/deserializer (SERDES) subsystem 308a coupled to the switch processing system 304, a laser subsystem 308b coupled to the SERDES subsystem 308a, and one or more optical waveguides 308c that couple the laser subsystem 308b to the optical waveguide coupling 306. As discussed below, in some embodiments the data transmission speed at which the switch device 300 is configured to transmit data may dictate the number of optical waveguide(s) 308c, with the specific examples below describing switch devices configured to transmit data at data transmission speeds of 50 GbE or less having a single optical waveguide 308c, switch devices configured to transmit data at data transmission speeds of 100 GbE having a pair of optical waveguides 308c, switch devices configured to transmit data at data transmission speeds of 200 GbE having four optical waveguides 308c, and switch devices configured to transmit data at data transmission speeds of 200 GbE having eight optical waveguides 308c. However, one of skill in the art in possession of the present disclosure will appreciate that other optical waveguide configurations will fall within the scope of the present disclosure as well.

Furthermore, a data receiving subsystem 310 couples the switch processing system 304 to the optical waveguide coupling 306, and in the illustrated embodiment includes a serializer/deserializer (SERDES) subsystem 310a coupled to the switch processing system 304, a photo detector subsystem 310b coupled to the SERDES subsystem 310a, and one or more optical waveguides 310c that couple the photo detector subsystem 310b to the optical waveguide coupling 306. Similarly as discussed above, the data transmission speed at which the switch device 300 is configured to receive data may dictate the number of optical waveguide(s) 310c, with the specific examples below describing switch devices configured to receive data at data transmission speeds of 50 GbE or less having a single optical waveguide 310c, switch devices configured to receive data at data transmission speeds of 100 GbE having a pair of optical waveguides 310c, switch devices configured to receive data at data transmission speeds of 200 GbE having four optical waveguides 310c, and switch devices configured to receive data at data transmission speeds of 400 GbE having eight optical waveguides 310c. However, one of skill in the art in possession of the present disclosure will appreciate that other optical waveguide configurations will fall within the scope of the present disclosure as well.

As such, while not specifically illustrated in FIG. 3, the optical waveguide coupling 306 may include alignment and coupling features that are configured to align and couple each of the optical waveguide(s) 308c and 310c with corresponding optical waveguide(s) on an optical waveguide coupling included on the multi-speed transceiver device of the present disclosure. Furthermore, while a specific switch device 300 has been illustrated, one of skill in the art in possession of the present disclosure will recognize that switch devices (or other devices operating according to the teachings of the present disclosure in a manner similar to that described below for the switch device 300) may include a variety of components and/or component configurations for providing conventional switch device functionality, as well as the functionality discussed below, while remaining within the scope of the present disclosure as well.

Figure 4:
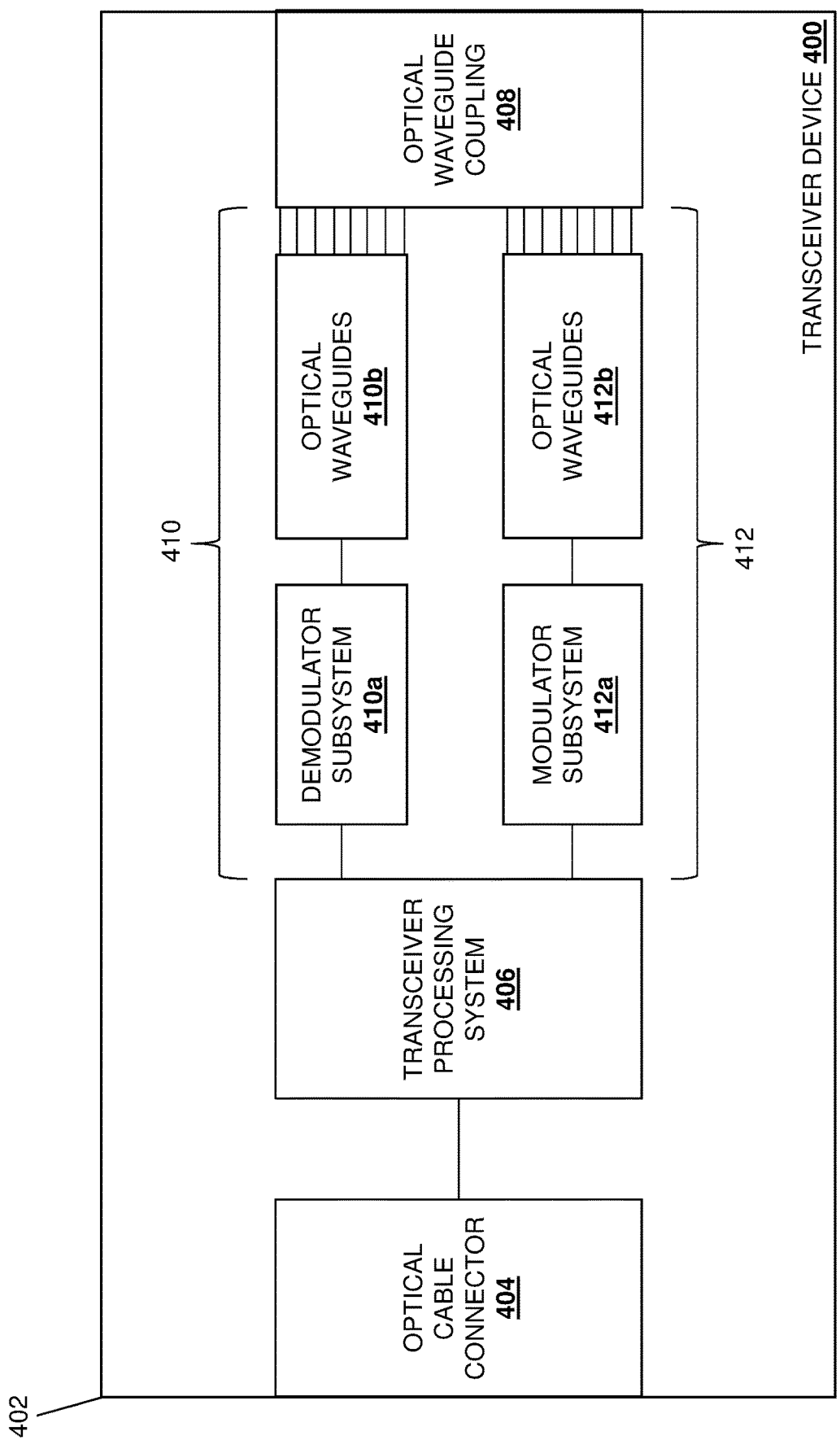
FIG. 4 is a schematic view illustrating an embodiment of a transceiver device that may be included in the networked system of FIG. 2.

Referring now to FIG. 4, an embodiment of a transceiver device 400 is illustrated that may provide each of the transceiver devices 208, 210, 214, and 216a-216d discussed above with reference to FIG. 2. In the illustrated embodiment, the transceiver device 400 includes a chassis 402 that houses the components of the transceiver device 400, only some of which are illustrated below. For example, the chassis 402 may include a cable connector that is illustrated and described in specific examples below as being provided by an optical cable connector 404 that is configured to connect to an optical cable, but that one of skill in the art in possession of the present disclosure will recognize may be provided by other types of cable connectors that connect to other types of cables while remaining within the scope of the present disclosure as well. In the illustrated embodiment, the chassis 402 also houses a transceiver processing system 406 (which may include the processor 102 discussed above with reference to FIG. 1) that is coupled to the optical cable connector 404, and may also house a memory system (not illustrated, but which may include the memory 114 discussed above with reference to FIG. 1) that is coupled to the transceiver processing system 406 and that includes instructions that, when executed by the transceiver processing system 406, cause the transceiver processing system 406 to perform any of the functionality of the transceiver devices discussed below.

The chassis 402 also includes an optical waveguide coupling 408 that may be accessible on an outer surface of the chassis 402 and that one of skill in the art in possession of the present disclosure will appreciate may include any of a variety of connection and/or securing features in order to connect with and secure to the optical waveguide coupling 306 on the switch device 300 (and server devices) of the present disclosure, discussed above. A data receiving subsystem 410 couples the transceiver processing system 406 to the optical waveguide coupling 408, and in the illustrated embodiment includes a demodulator subsystem 410a coupled to the transceiver processing system 406, and a plurality of optical waveguides 410b that couple the demodulator subsystem 410a to the optical waveguide coupling 408. Furthermore, a data transmission subsystem 412 couples the transceiver processing system 406 to the optical waveguide coupling 408, and in the illustrated embodiment includes a modulator subsystem 412a coupled to the transceiver processing system 406, and a plurality of optical waveguides 412b that couple the modulator subsystem 412a to the optical waveguide coupling 408. In the specific examples provided below, the plurality of optical waveguides 410b include eight waveguides that are configured to receive data transmitted at data transmission speeds of up to 400 GbE, and the plurality of optical waveguides 412b include eight waveguides that are configured to transmit data at data transmission speeds of up to 400 GbE. However, one of skill in the art in possession of the present disclosure will appreciate that other configurations for the optical waveguides that support data transmitted at different data transmission speeds will fall within the scope of the present disclosure as well As such, while not specifically illustrated in FIG. 4, the optical waveguide coupling 408 may include alignment and coupling features that are configured to align and couple each of the plurality of optical waveguides 410b and 412b with corresponding optical waveguide(s) on the optical waveguide coupling 306 included on the switch device 300. Furthermore, while a specific transceiver device 400 has been illustrated, one of skill in the art in possession of the present disclosure will recognize that the multi-speed transceiver devices of the present disclosure may include a variety of components and/or component configurations for providing conventional transceiver device functionality, as well as the functionality described below, while remaining within the scope of the present disclosure as well.

Figure 5:
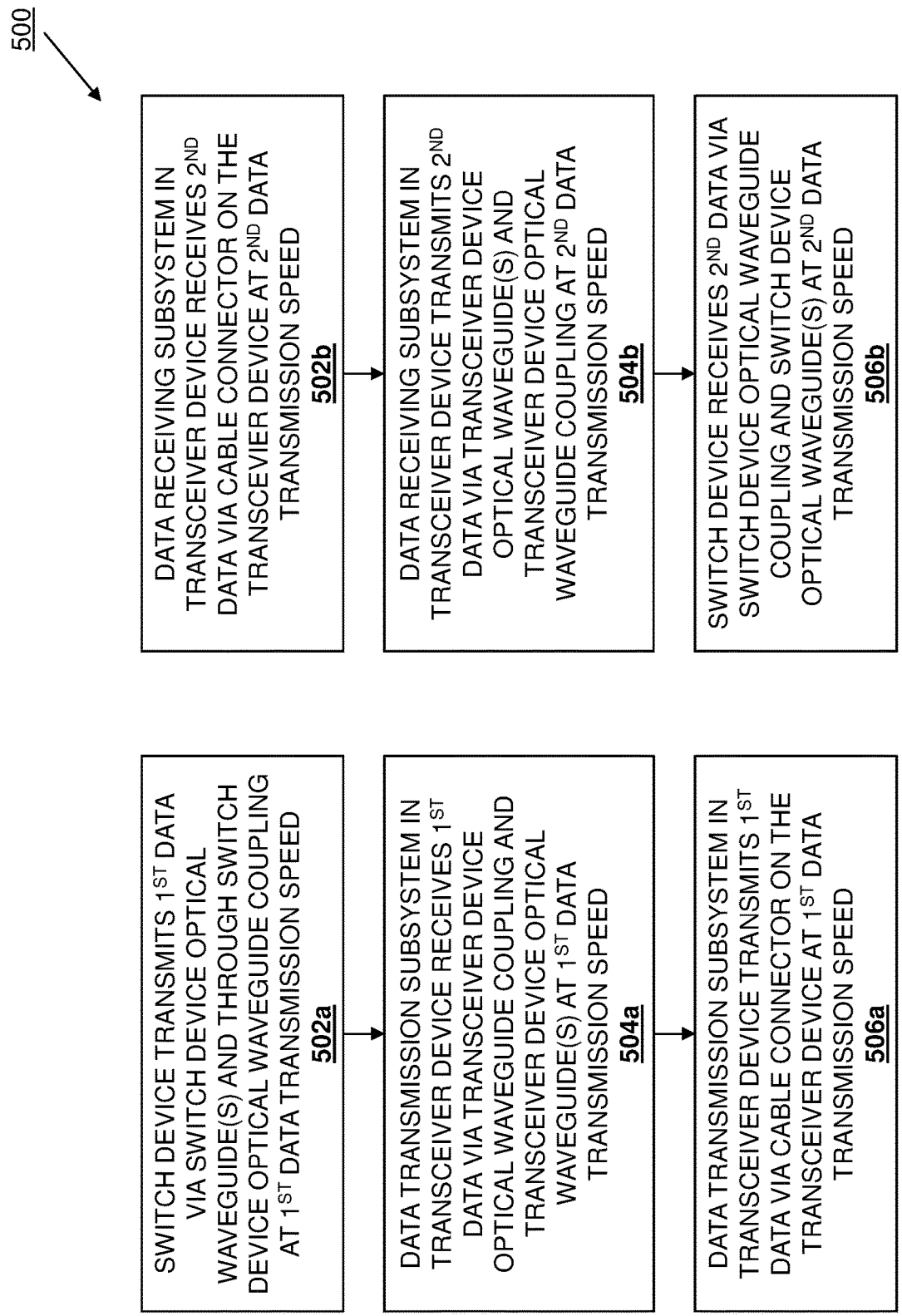
FIG. 5 is a flow chart illustrating an embodiment of a method for transmitting data using a multi-speed transceiver device.

Referring now to FIG. 5, an embodiment of a method 500 for transmitting data using a multi-speed transceiver device is illustrated. As discussed below, the systems and methods of the present disclosure provide a multi-speed transceiver device that is configured to transmit and receive data at a variety of different data transmission speeds via one or more of a plurality of optical waveguides. For example, the multi-speed transceiver device of the present disclosure may include a chassis having an optical cable connector coupled to a transceiver processing system, and an optical waveguide coupling. A data receiving subsystem in the chassis couples the transceiver processing system to the optical waveguide coupling, includes data receiving optical waveguides, and transmits first data received from the transceiver processor to the optical waveguide coupling over a number of the data receiving optical waveguides that depends on a first data transmission speed at which the first data was received. A data transmission subsystem in the chassis couples the transceiver processing system to the optical waveguide coupling, includes data transmission optical waveguides, and receives second data via the optical waveguide coupling and over a number of the data transmission optical waveguides that depends on a second data transmission speed at which the second data was received, and then transmits that second data to the transceiver processing system. As such, the multi-speed transceiver device may be utilized with devices transmitting data at different data transmission speeds, eliminating many of the issues associated with conventional transceiver devices that have static data transmission speed configurations.

In an embodiment, during or prior to the method 500, a transceiver device 400 provided according to the teachings of the present disclosure may be coupled to each of a pair of communicating devices, and a cable may be utilized to connect those transceiver devices. For example, with reference to FIG. 2, the optical waveguide coupling 408 on each of the transceiver devices 208/400 and 210/400 may be connected to and secured with the optical waveguide coupling 306 on the switch device 202 and a similar optical waveguide coupling (not illustrated) on the server device 204, respectively, and the cable 212 may be connected to the optical cable connectors 404 on the transceiver devices 208/400 and 210/400. Similarly, with reference again to FIG. 2, the optical waveguide coupling 408 on each of the transceiver devices 214/400 and transceiver devices 216a-216d/400 may be connected to and secured with the optical waveguide coupling 306 on the switch device 202 and similar optical waveguide couplings (not illustrated) on the server device 204, respectively, and the cable 218 may be connected to the optical cable connectors 404 on the transceiver devices 208/400 and 216a-216d/400. Thus, while the specific illustrations and corresponding discussions below are directed to a transceiver device 400 (e.g., the transceiver device 208 or 214) connected to the switch device 202/300 (via their optical waveguide couplings 408 and 306, respectively) and the corresponding transmission and receiving of data by the switch device 202/300 via the transceiver device 400, one of skill in the art in possession of the present disclosure will appreciate that the transceiver device 210/server device 204 and the transceiver devices 216a-216d/server device 206 may operate in substantially the same manner as described below for the transceiver device 400 and switch device 202/300 in order to transmit and receive data.

As will be appreciated by one of skill in the art in possession of the present disclosure, the switch device 202/300 and transceiver device 400 may operate to transmit data (e.g., via the cables 212 or 218) according to blocks 502a, 504a, and 506a of the method 500, and may operate to receive data (e.g., via the cables 212 or 218) according to blocks 502b, 504b, and 506b of the method 500, and the transmission and receiving of data via the method 500 may occur simultaneously or at different times. As such, the discussion of blocks 502a-506a before blocks 502b-506b of the method 500 should not be interpreted as dictating any ordering of the transmission and receiving of data via the method 500. Furthermore, the examples provided below describe the switch device 202/300 configured to transmit/receive data at different data transmission speeds (e.g., 50 GbE data transmission speeds (or less) in FIGS. 6A-6D, 100 GbE data transmission speeds in FIGS. 7A-7D, 200 GbE data transmission speeds in FIGS. 8A-8D, and 400 GbE data transmission speeds in FIGS. 9A-9D), but one of skill in the art in possession of the present disclosure will appreciate that switch devices configured to transmit/receive data at data transmission speeds other than those specifically identified herein will fall within the scope of the present disclosure as well.

The method 500 may begin at block 502a where a switch device transmits first data via switch device optical waveguide(s) and through a switch device optical waveguide coupling at a first data transmission speed. As will be appreciated by one of skill in the art in possession of the present disclosure, the data transmitted by the switch device 202/300 at block 502a may be received from another device coupled to the switch device 202/300 (not illustrated), may be generated by the switch device 202/300, and/or may be provided for transmission by the switch device 202/300 in a variety of manners that would be apparent to one of skill in the art in possession of the present disclosure.

Figure 6A:
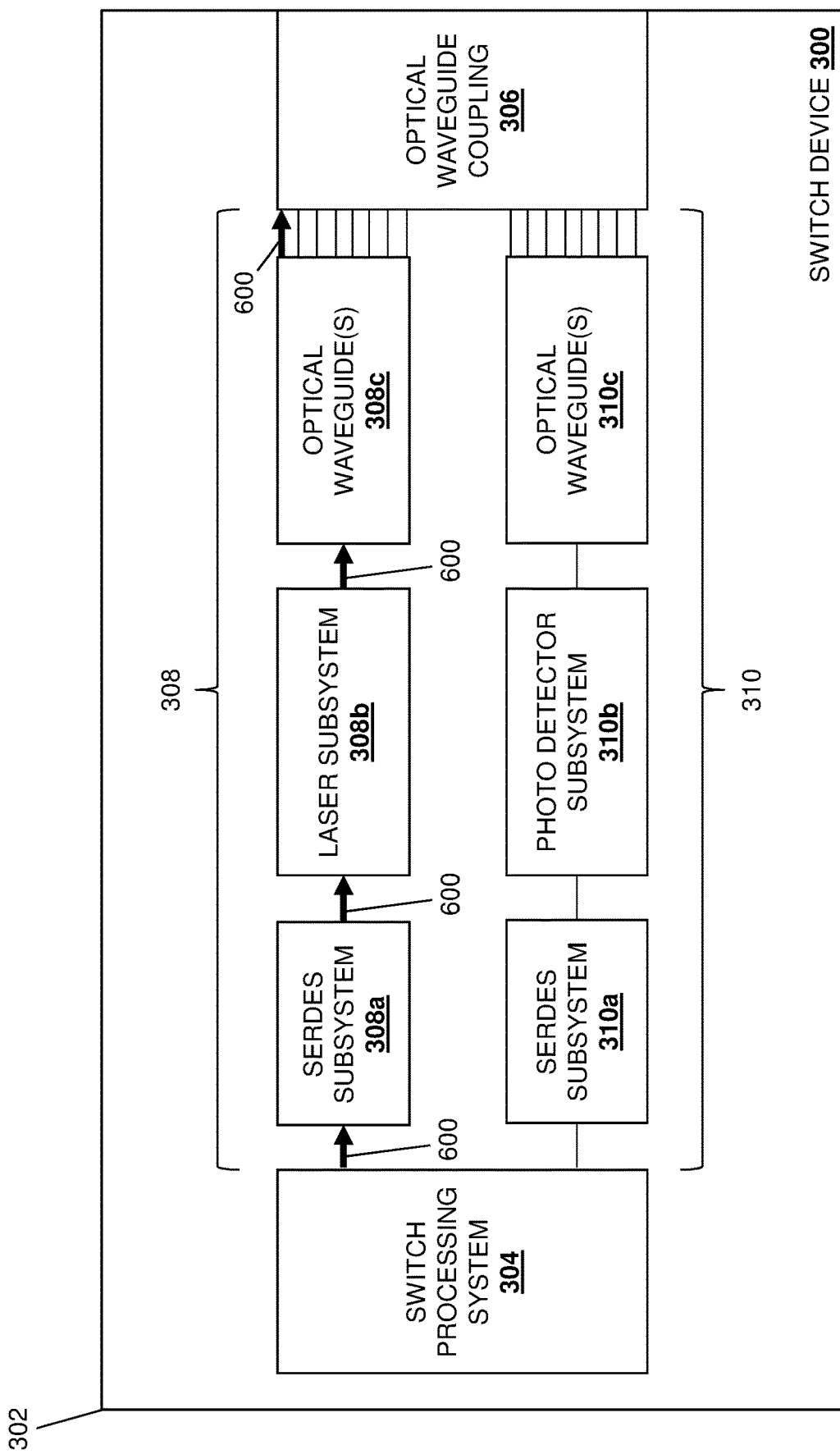
FIG. 6A is a schematic view illustrating an embodiment of the switch device of FIG. 3 operating during the method of FIG. 5.

With reference to FIG. 6A, in an embodiment of block 502a in which the switch device 202/300 is configured to transmit data at data transmission speeds of 50 GbE or less, the switch device 300 may perform data transmission operations 600 using the data transmission subsystem 308. For example, in the illustrated embodiment the data transmission operations 600 may include the switch processing system 304 transmitting data to the SERDES subsystem 308a. The SERDES subsystem 308a may receive the data from the switch processing system 304 and perform serializer/deserializer operations to transmit the data to the laser subsystem 308b. The laser subsystem 308b may receive the data (transmitted electrically via conductive mediums in the data transmission subsystem 308) from the SERDES system 308a, convert the data to optical data, and then transmit the optical data over one optical waveguide 308c and via the optical waveguide coupling 306 (as illustrated by the single bolded arrow extending between the optical waveguide(s) 308c and the optical waveguide coupling 306 in FIG. 6A). As will be appreciated by one of skill in the art in possession of the present disclosure, the one optical waveguide 308c may be configured to transmit data at data transmission speeds of up to 50 GbE, and thus when the switch device 202/300 is configured to transmit data at data transmission speeds of 50 GbE or less, only a single optical waveguide 308c is required. As such, while eight connections are illustrated in FIG. 6A between the optical waveguides 308c and the optical waveguide coupling 306, only a single optical waveguide 308c may be required in the switch device 202/300 when it is configured to transmit data at data transmission speeds of 50 GbE or less.

Figure 7A:
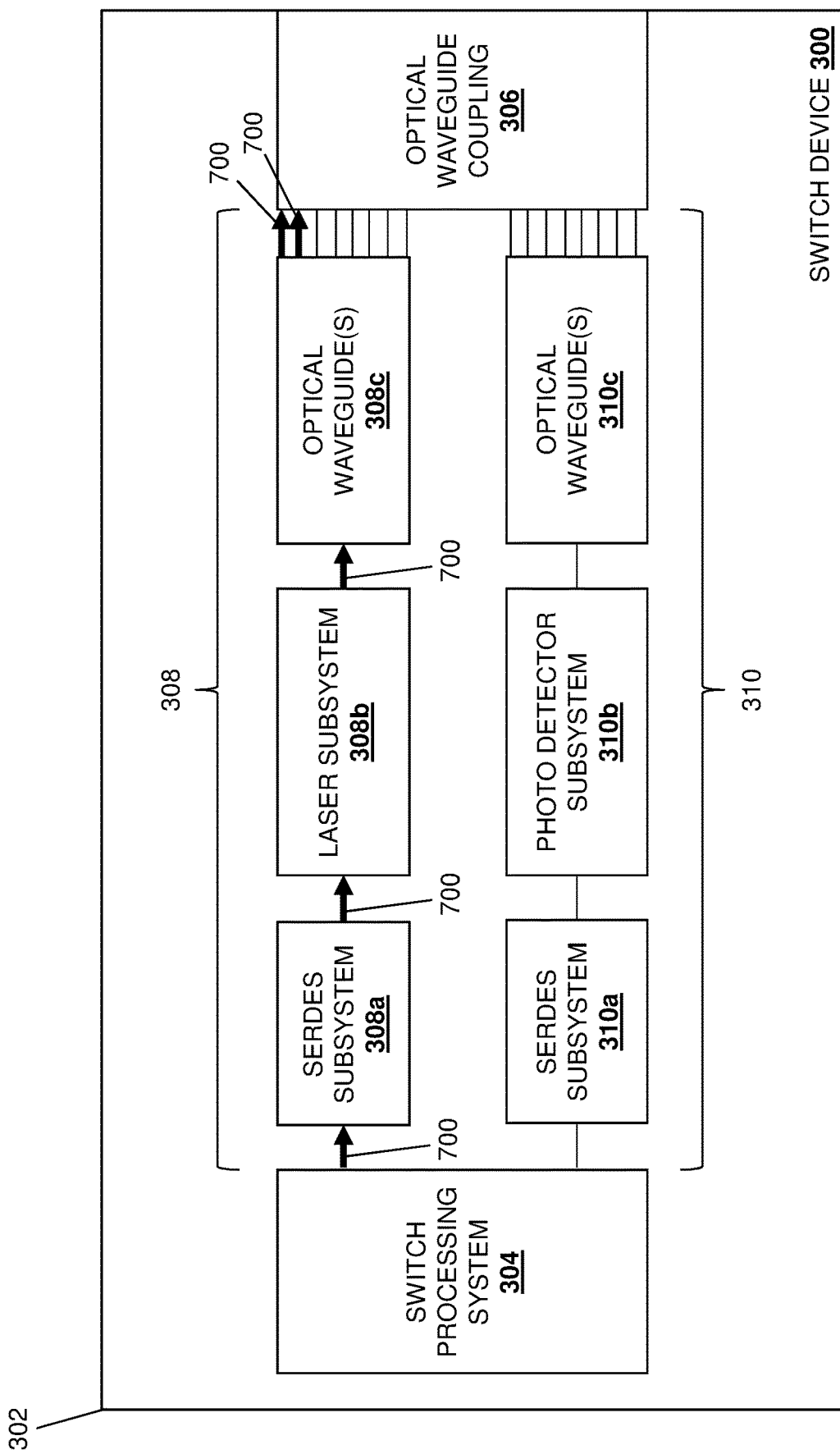
FIG. 7A is a schematic view illustrating an embodiment of the switch device of FIG. 3 operating during the method of FIG. 5.

With reference to FIG. 7A, in an embodiment of block 502a in which the switch device 202/300 is configured to transmit data at data transmission speeds of 100 GbE, the switch device 300 may perform data transmission operations 700 using the data transmission subsystem 308. For example, in the illustrated embodiment the data transmission operations 700 may include the switch processing system 304 transmitting data to the SERDES subsystem 308a. The SERDES subsystem 308a may receive the data from the switch processing system 304 and perform serializer/deserializer operations to transmit the data to the laser subsystem 308b. The laser subsystem 308b may receive the data (transmitted electrically via conductive mediums in the data transmission subsystem 308) from the SERDES system 308a, convert the data to optical data, and transmit the optical data over a pair of optical waveguides 308c and via the optical waveguide coupling 306 (as illustrated by the pair of bolded arrows extending between the optical waveguide(s) 308c and the optical waveguide coupling 306 in FIG. 7A). As will be appreciated by one of skill in the art in possession of the present disclosure, each optical waveguide 308c may be configured to transmit data at data transmission speeds of up to 50 GbE, and thus when the switch device 202/300 is configured to transmit data at data transmission speeds of 100 GbE, a pair of optical waveguides 308c is required. As such, while eight connections are illustrated in FIG. 7A between the optical waveguides 308c and the optical waveguide coupling 306, only a pair of optical waveguides 308c may be required in the switch device 202/300 when it is configured to transmit data at data transmission speeds of 100 GbE.

Figure 8A:
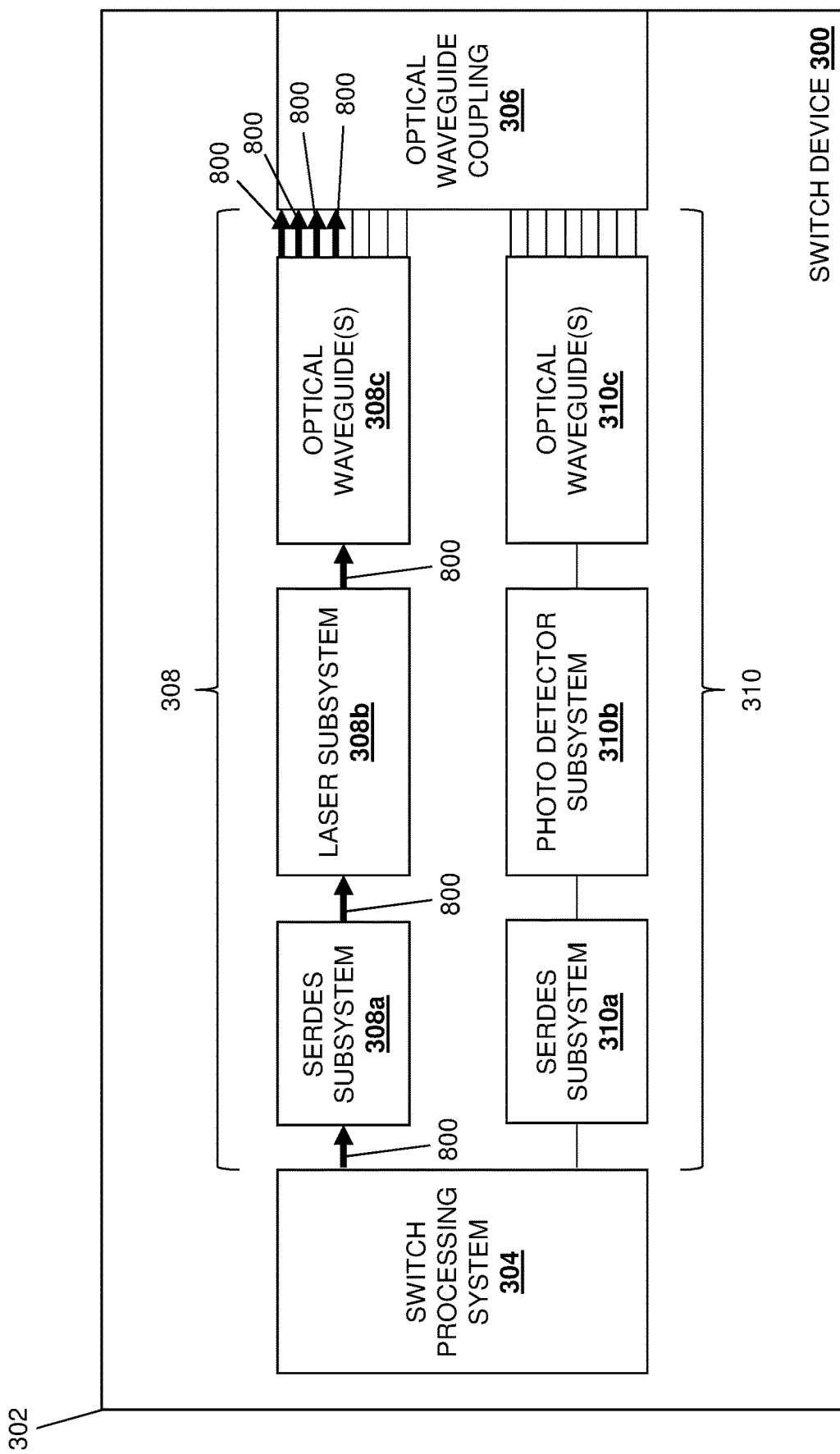
FIG. 8A is a schematic view illustrating an embodiment of the switch device of FIG. 3 operating during the method of FIG. 5.

With reference to FIG. 8A, in an embodiment of block 502a in which the switch device 202/300 is configured to transmit data at data transmission speeds of 200 GbE, the switch device 300 may perform data transmission operations 800 using the data transmission subsystem 308. For example, in the illustrated embodiment the data transmission operations 800 may include the switch processing system 304 transmitting data to the SERDES subsystem 308a. The SERDES subsystem 308a may receive the data from the switch processing system 304 and perform serializer/deserializer operations to transmit the data to the laser subsystem 308b. The laser subsystem 308b may receive the data (transmitted electrically via conductive mediums in the data transmission subsystem 308) from the SERDES system 308a, convert the data to optical data, and transmit the optical data over four optical waveguides 308c and via the optical waveguide coupling 306 (as illustrated by the four bolded arrows extending between the optical waveguide(s) 308c and the optical waveguide coupling 306 in FIG. 8A). As will be appreciated by one of skill in the art in possession of the present disclosure, each optical waveguide 308c may be configured to transmit data at data transmission speeds of up to 50 GbE, and thus when the switch device 202/300 is configured to transmit data at data transmission speeds of 200 GbE, four optical waveguides 308c are required. As such, while eight connections are illustrated in FIG. 8A between the optical waveguides 308c and the optical waveguide coupling 306, only four optical waveguides 308c may be required in the switch device 202/300 when it is configured to transmit data at data transmission speeds of 200 GbE.

Figure 9A:
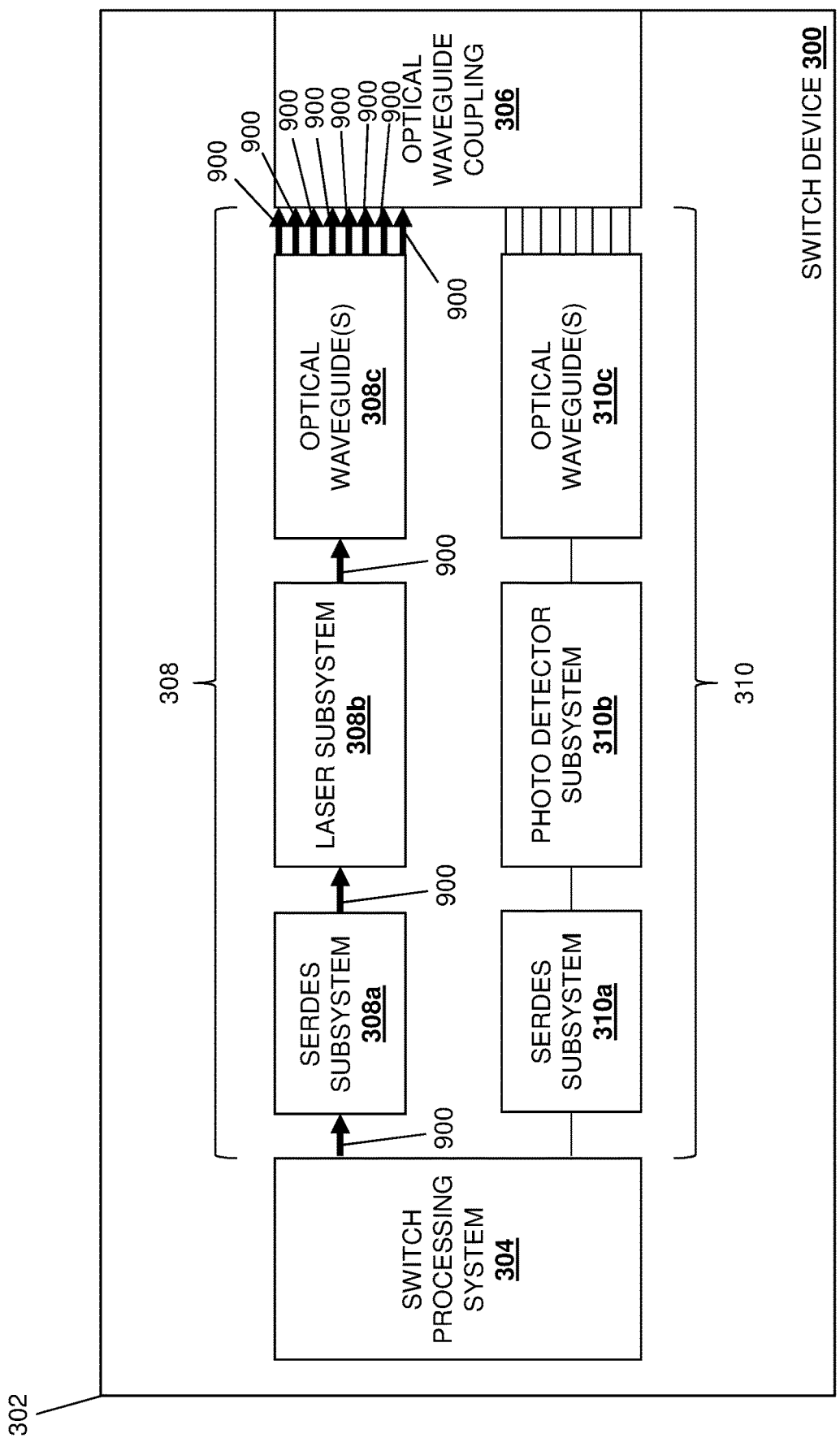
FIG. 9A is a schematic view illustrating an embodiment of the switch device of FIG. 3 operating during the method of FIG. 5.

With reference to FIG. 9A, in an embodiment of block 502a in which the switch device 202/300 is configured to transmit data at data transmission speeds of 400 GbE, the switch device 300 may perform data transmission operations 900 using the data transmission subsystem 308. For example, in the illustrated embodiment the data transmission operations 900 may include the switch processing system 304 transmitting data to the SERDES subsystem 308a. The SERDES subsystem 308a may receive the data from the switch processing system 304 and perform serializer/deserializer operations to transmit the data to the laser subsystem 308b. The laser subsystem 308b may receive the data (transmitted electrically via conductive mediums in the data transmission subsystem 308) from the SERDES system 308a, convert the data to optical data, and transmit the optical data over eight optical waveguides 308c and via the optical waveguide coupling 306 (as illustrated by the eight bolded arrows extending between the optical waveguide(s) 308c and the optical waveguide coupling 306 in FIG. 9A). As will be appreciated by one of skill in the art in possession of the present disclosure, each optical waveguide 308c may be configured to transmit data at data transmission speeds of up to 50 GbE, and thus when the switch device 202/300 is configured to transmit data at data transmission speeds of 400 GbE, eight optical waveguides 308c are required.

As will be appreciated by one of skill in the art in possession of the present disclosure, the transmission of data via the data transmission subsystem 308 discussed above may differ depending on which of the cables 212 or 218 are utilized. For example, data transmitted over one or more optical waveguides 308c and via the cable 212 to the single transceiver device 210 may be transmitted in a manner that allows it to be provided via the single transceiver device 210 (and combined if necessary), discussed in further detail below. However, data transmitted via the cable 218 to the multiple transceiver devices 216a-216d may be transmitted via separate optical waveguides 308c and to those different transceiver devices 216a-216d. In an embodiment, if the switch device 202/300 is configured to transmit data via the cable 218 and to the transceiver devices 216a-216d, each of the optical waveguides 308c used to transmit that data may operate as an independent data channel as part of the logical breakout provided by the switch device configuration. For example, if the switch device 202/300 is configured to transmit data at 25 GbE to each of the four transceiver devices 216a-216d via the cable 218, then four of the optical waveguides 308c may be used to transmit data at 25 GbE each to their corresponding transceiver device.

Figure 6B:
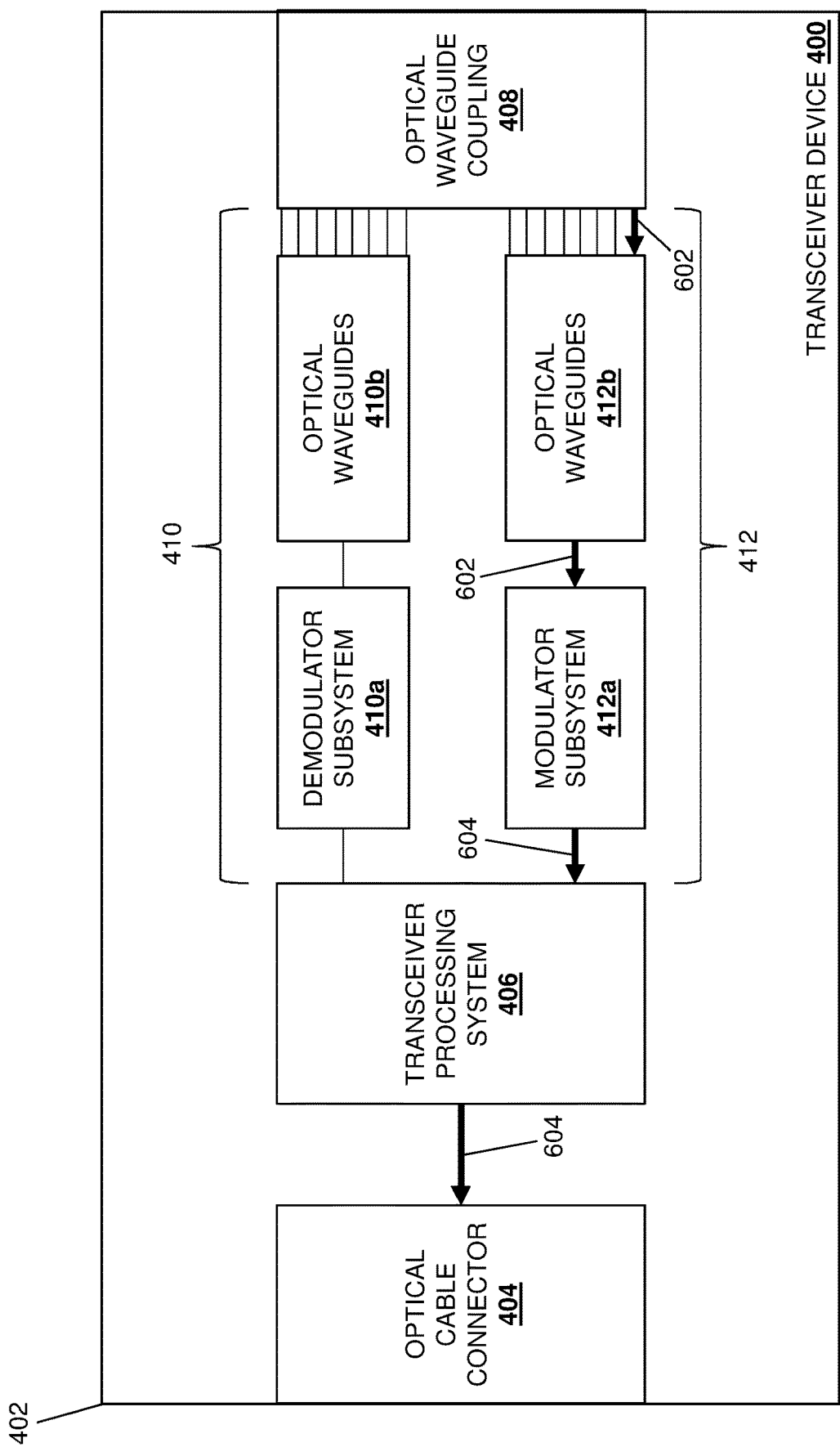
FIG. 6B is a schematic view illustrating an embodiment of the transceiver device of FIG. 4 operating during the method of FIG. 5.

The method 500 then proceeds to block 504a where a data transmission subsystem in a transceiver device receives the first data via a transceiver device optical waveguide coupling and transceiver device optical waveguide(s) at the first data transmission speed. With reference to FIG. 6B, in an embodiment of block 504a in which the switch device 202/300 transmitted the data at block 504a at a data transmission speed of 50 GbE or less, the transceiver device 400 may perform data receiving operations 602 using the data transmission subsystem 412. For example, in the illustrated embodiment the data receiving operations 602 may include the data that was transmitted by the switch device 202/300 at block 502a being received via the optical waveguide coupling 408 and one optical waveguide 412b (as illustrated by the single bolded arrow extending between the optical waveguide coupling 408 and the optical waveguides 412b in FIG. 6B), and transmitted via the one optical waveguide 412b to the modulator subsystem 412a in the data transmission subsystem 412. As discussed above, each of the optical waveguides 308c/412b may be configured to transmit data at data transmission speeds of up to 50 GbE, and thus when the switch device 202/300 transmitted the data at block 502a at data transmission speeds of 50 GbE or less over the single optical waveguide 308c, that data will be received via a single optical waveguide 412b in the transceiver device 400 that is coupled to the single optical waveguide 308c in the switch device 202/300 (e.g., via the optical waveguide couplings 306 and 408). As such, only one of the eight available optical waveguides 412b in the transceiver device 400 will be utilized to receive data transmitted by the switch device 202/300 at data transmission speeds of 50 GbE or less.

Figure 7B:
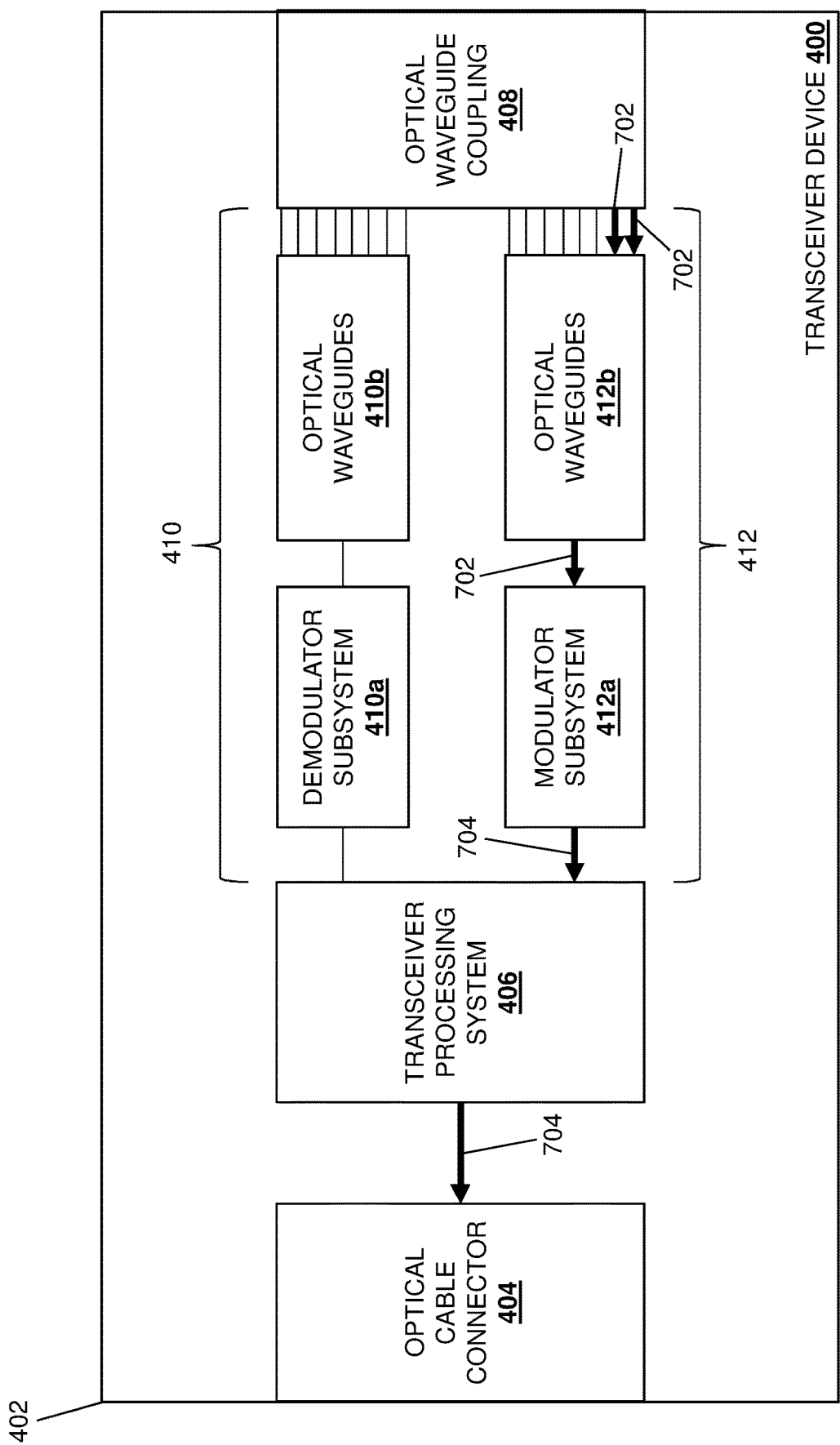
FIG. 7B is a schematic view illustrating an embodiment of the transceiver device of FIG. 4 operating during the method of FIG. 5.

With reference to FIG. 7B, in an embodiment of block 504a in which the switch device 202/300 transmitted the data at block 504a at a data transmission speed of 100 GbE, the transceiver device 400 may perform data receiving operations 702 using the data transmission subsystem 412. For example, in the illustrated embodiment the data receiving operations 702 may include the data that was transmitted by the switch device 202/300 at block 502a being received via the optical waveguide coupling 408 and a pair of optical waveguides 412b (as illustrated by the pair of bolded arrows extending between the optical waveguide coupling 408 and the optical waveguides 412b in FIG. 7B), and transmitted via the pair of optical waveguides 412b to the modulator subsystem 412a in the data transmission subsystem 412. As discussed above, each of the optical waveguides 308c/412b may be configured to transmit data at data transmission speeds of up to 50 GbE, and thus when the switch device 202/300 transmitted the data at block 502a at data transmission speeds of 100 GbE over the pair of optical waveguides 308c, that data will be received via a pair of optical waveguides 412b in the transceiver device 400 that are coupled to the pair of optical waveguides 308c in the switch device 202/300 (e.g., via the optical waveguide couplings 306 and 408). As such, only a pair of the eight available optical waveguides 412b in the transceiver device 400 will be utilized to receive data transmitted by the switch device 202/300 at data transmission speeds of 100 GbE.

Figure 8B:
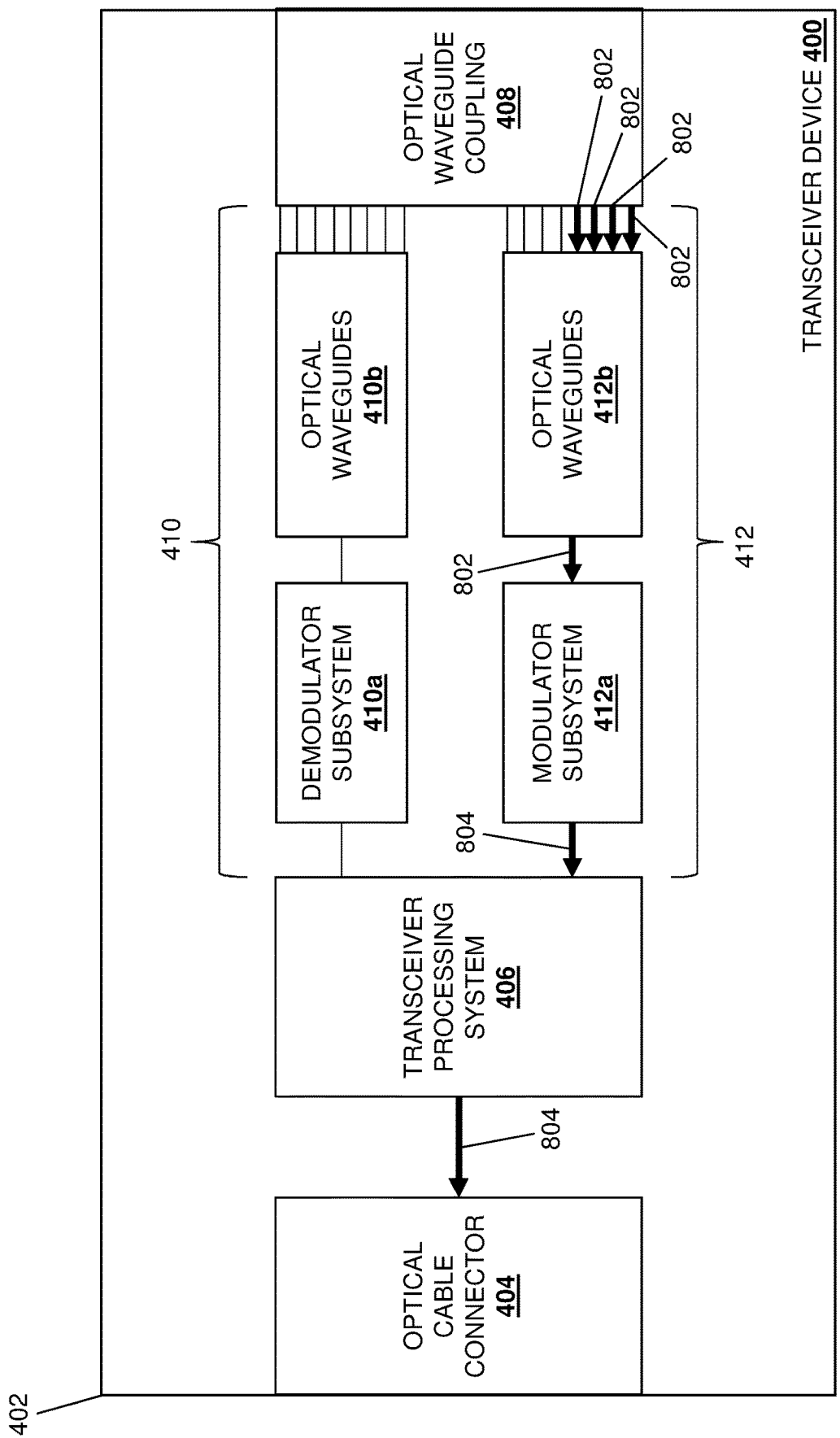
FIG. 8B is a schematic view illustrating an embodiment of the transceiver device of FIG. 4 operating during the method of FIG. 5.

With reference to FIG. 8B, in an embodiment of block 504a in which the switch device 202/300 transmitted the data at block 504a at a data transmission speed of 200 GbE, the transceiver device 400 may perform data receiving operations 802 using the data transmission subsystem 412. For example, in the illustrated embodiment the data receiving operations 802 may include the data that was transmitted by the switch device 202/300 at block 502a being received via the optical waveguide coupling 408 and four optical waveguides 412b (as illustrated by the four bolded arrows extending between the optical waveguide coupling 408 and the optical waveguides 412b in FIG. 8B), and transmitted via the four optical waveguides 412b to the modulator subsystem 412a in the data transmission subsystem 412. As discussed above, each of the optical waveguides 308c/412b may be configured to transmit data at data transmission speeds of up to 50 GbE, and thus when the switch device 202/300 transmitted the data at block 502a at data transmission speeds of 200 GbE over the four optical waveguides 308c, that data will be received via four optical waveguides 412b in the transceiver device 400 that are coupled to the four optical waveguides 308c in the switch device 202/300 (e.g., via the optical waveguide couplings 306 and 408). As such, only four of the eight available optical waveguides 412b in the transceiver device 400 will be utilized to receive data transmitted by the switch device 202/300 at data transmission speeds of 200 GbE.

Figure 9B:
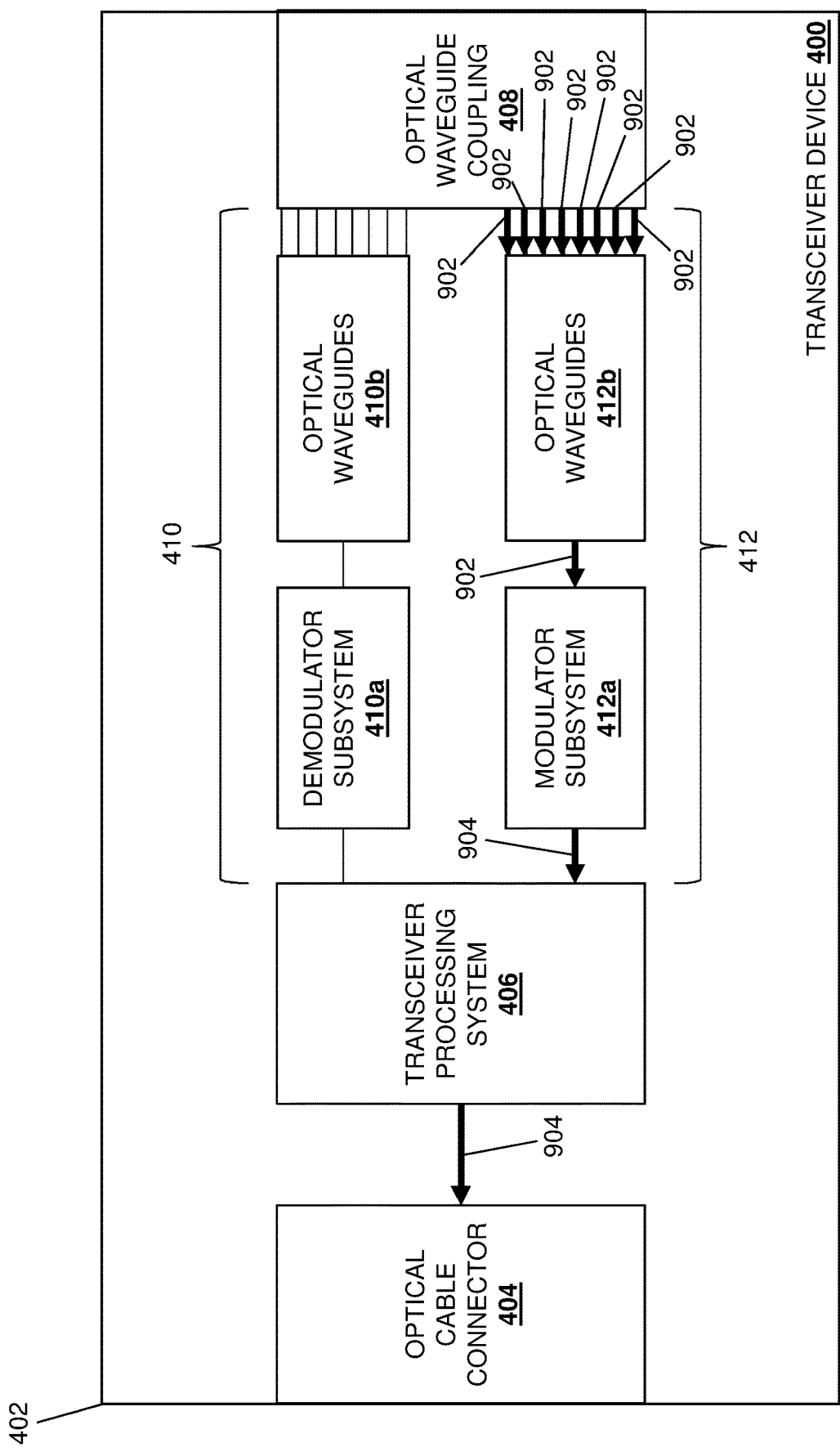
FIG. 9B is a schematic view illustrating an embodiment of the transceiver device of FIG. 4 operating during the method of FIG. 5.

With reference to FIG. 9B, in an embodiment of block 504a in which the switch device 202/300 transmitted the data at block 504a at a data transmission speed of 400 GbE, the transceiver device 400 may perform data receiving operations 902 using the data transmission subsystem 412. For example, in the illustrated embodiment the data receiving operations 902 may include the data that was transmitted by the switch device 202/300 at block 502a being received via the optical waveguide coupling 408 and eight optical waveguides 412b (as illustrated by the eight bolded arrows extending between the optical waveguide coupling 408 and the optical waveguides 412b in FIG. 9B), and transmitted via the eight optical waveguides 412b to the modulator subsystem 412a in the data transmission subsystem 412. As discussed above, each of the optical waveguides 308c/412b may be configured to transmit data at data transmission speeds of up to 50 GbE, and thus when the switch device 202/300 transmitted the data at block 502a at data transmission speeds of 400 GbE over the eight optical waveguides 308c, that data will be received via eight optical waveguides 412b in the transceiver device 400 that are coupled to the eight optical waveguides 308c in the switch device 202/300

(e.g., via the optical waveguide couplings 306 and 408). As such, all eight available optical waveguides 412b in the transceiver device 400 will be utilized to receive data transmitted by the switch device 202/300 at data transmission speeds of 400 GbE.

The method 500 then proceeds to block 506a where the data transmission subsystem in the transceiver device transmits the first data via a cable connector on the transceiver device at the first data transmission speed. With reference back to FIG. 6B, in an embodiment of block 506a, the data transmission subsystem 412 and the transceiver processing system 406 in the transceiver device 400 may perform data transmission operations 604 to transmit data via the optical cable connector 404 and over the cable (e.g., the cable 212 or 218) connected to the optical cable connector 404. For example, data transmission operations 604 may include the modulator subsystem 412a in the data transmission subsystem 412 modulating the data received via the one optical waveguide 412b as part of the data receiving operations 602 discussed above with regard to block 504a to provide modulated data, and providing that modulated data to the transceiver processing subsystem 406. The data transmission operations 604 may also include the transceiver processing system 406 then transmitting that modulated data via the optical cable connector 404 and over the cable coupled to the optical cable connector 404 (e.g., to the transceiver device 400/server device 204 or transceiver devices 400/server device 206 coupled to the other end of that cable.

With reference back to FIG. 7B, in an embodiment of block 506a, the data transmission subsystem 412 and the transceiver processing system 406 in the transceiver device 400 may perform data transmission operations 704 to transmit data via the optical cable connector 404 and over the cable (e.g., the cable 212 or 218) connected to the optical cable connector 404. For example, data transmission operations 704 may include the modulator subsystem 412a in the data transmission subsystem 412 modulating the data received via the pair of optical waveguides 412b as part of the data receiving operations 702 discussed above with regard to block 504a to provide modulated data, and providing that modulated data to the transceiver processing subsystem 406. The data transmission operations 704 may also include the transceiver processing system 406 then transmitting that modulated data via the optical cable connector 404 and over the cable coupled to the optical cable connector 404 (e.g., to the transceiver device 400/server device 204 or transceiver devices 400/server device 206 coupled to the other end of that cable.)

With reference back to FIG. 8B, in an embodiment of block 506a, the data transmission subsystem 412 and the transceiver processing system 406 in the transceiver device 400 may perform data transmission operations 804 to transmit data via the optical cable connector 404 and over the cable (e.g., the cable 212 or 218) connected to the optical cable connector 404. For example, data transmission operations 804 may include the modulator subsystem 412a in the data transmission subsystem 412 modulating the data received via the four optical waveguides 412b as part of the data receiving operations 802 discussed above with regard to block 504a to provide modulated data, and providing that modulated data to the transceiver processing subsystem 406. The data transmission operations 804 may also include the transceiver processing system 406 then transmitting that modulated data via the optical cable connector 404 and over the cable coupled to the optical cable connector 404 (e.g., to the transceiver device 400/server device 204 or transceiver devices 400/server device 206 coupled to the other end of that cable.)

With reference back to FIG. 9B, in an embodiment of block 506a, the data transmission subsystem 412 and the transceiver processing system 406 in the transceiver device 400 may perform data transmission operations 904 to transmit data via the optical cable connector 404 and over the cable (e.g., the cable 212 or 218) connected to the optical cable connector 404. For example, data transmission operations 904 may include the modulator subsystem 412a in the data transmission subsystem 412 modulating the data received via the eight optical waveguides 412b as part of the data receiving operations 902 discussed above with regard to block 504a to provide modulated data, and providing that modulated data to the transceiver processing subsystem 406. The data transmission operations 704 may also include the transceiver processing system 406 then transmitting that modulated data via the optical cable connector 404 and over the cable coupled to the optical cable connector 404 (e.g., to the transceiver device 400/server device 204 or or transceiver devices 400/server device 206 coupled to the other end of that cable.)

Thus, the transceiver device 400 may be connected to switch devices or server devices that are configured to transmit data at different data transmission speeds, and the plurality of optical waveguides (e.g., eight in the embodiments discussed above) in the transceiver device 400 will be coupled to corresponding optical waveguide(s) in the switch devices or server devices that are utilized to support their configured data transmission speed (e.g., one optical waveguide utilized to support data transmission speeds of 50 GbE or less, a pair of optical waveguides utilized to support data transmission speeds of 100 GbE, four optical waveguides utilized to support data transmission speeds of 200 GbE, and eight optical waveguides utilized to support data transmission speeds of 400 GbE). As such, the same transceiver device may be utilized with different switch devices and server devices regardless of their configured data transmission speed, thus eliminating the issues associated with conventional transceiver devices that have static data transmission speed configurations.

In other embodiments, the method 500 may begin at block 502b where a data receiving subsystem in the transceiver device receives second data via the cable connector on the transceiver device at a second data transmission speed. As will be appreciated by one of skill in the art in possession of the present disclosure, the data received by the transceiver device 400 at block 502b may be received from another device (e.g., the server devices 204 or 206) coupled to the transceiver device 400 via a cable (i.e., connected to the optical cable connector 404), and/or may be provided for receiving by the transceiver device 400 in a variety of manners that would be apparent to one of skill in the art in possession of the present disclosure.

Figure 6C:
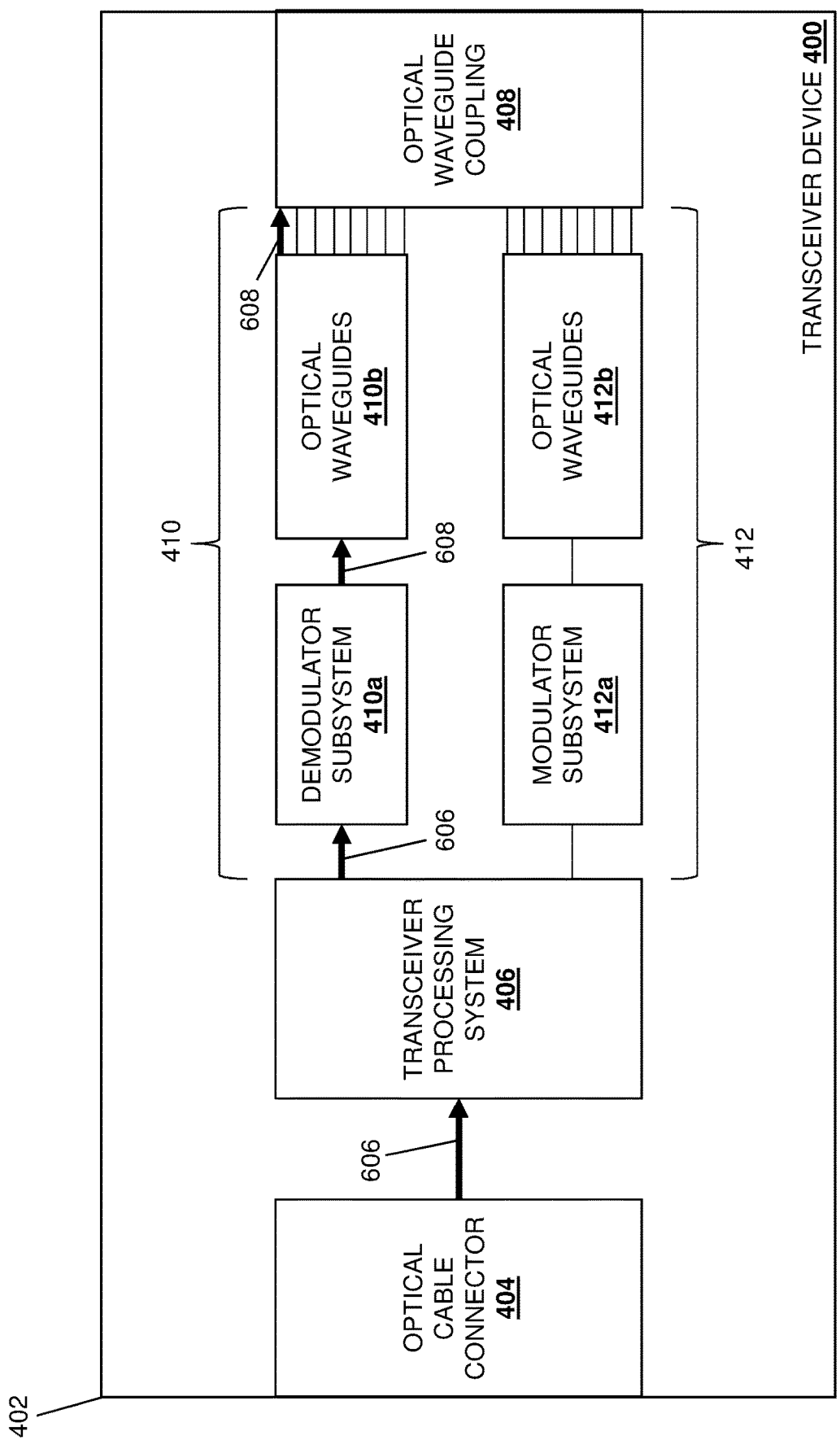
FIG. 6C is a schematic view illustrating an embodiment of the transceiver device of FIG. 4 operating during the method of FIG. 5.

With reference to FIG. 6C, in an embodiment of block 502b in which the switch device 202/300 is configured to receive data at data transmission speeds of 50 GbE or less, and thus data received by the transceiver device 400 at block 502b will have been transmitted at a data transmission speed of 50 GbE or less, the transceiver device 400 may perform data receiving operations 606 using the transceiver processing system 406 and the data receiving subsystem 410. For example, the data receiving operations 606 may include the transceiver processing system 406 receiving modulated data via the optical cable connector 404 and the cable coupled to the optical cable connector 404 (e.g., with that cable also coupled to the transceiver device 400/server device 204 or 206). The data receiving operations 606 may also include the transceiver processing system 406 providing the modulated data to the demodulator subsystem 410a.

Figure 7C:
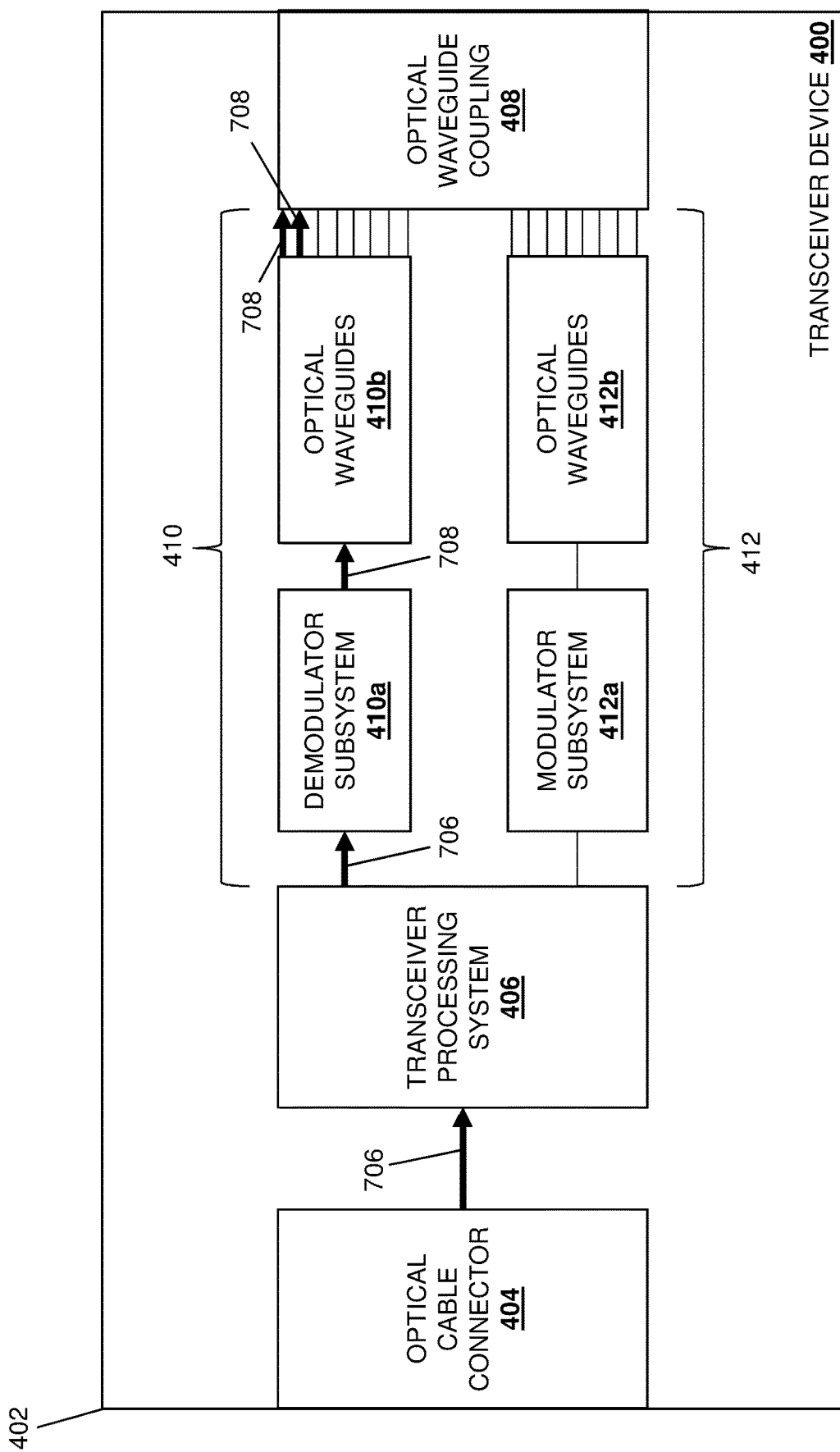
FIG. 7C is a schematic view illustrating an embodiment of the transceiver device of FIG. 4 operating during the method of FIG. 5.

With reference to FIG. 7C, in an embodiment of block 502b in which the switch device 202/300 is configured to receive data at data transmission speeds of 100 GbE, and thus data received by the transceiver device 400 at block 502b will have been transmitted at a data transmission speed of 100 GbE, the transceiver device 400 may perform data receiving operations 706 using the transceiver processing system 406 and the data receiving subsystem 410. For example, the data receiving operations 706 may include the transceiver processing system 406 receiving modulated data via the optical cable connector 404 and the cable coupled to the optical cable connector 404 (e.g., with that cable also coupled to the transceiver device 400/server device 204 or 206). The data receiving operations 706 may also include the transceiver processing system 406 providing the modulated data to the demodulator subsystem 410a.

Figure 8C:
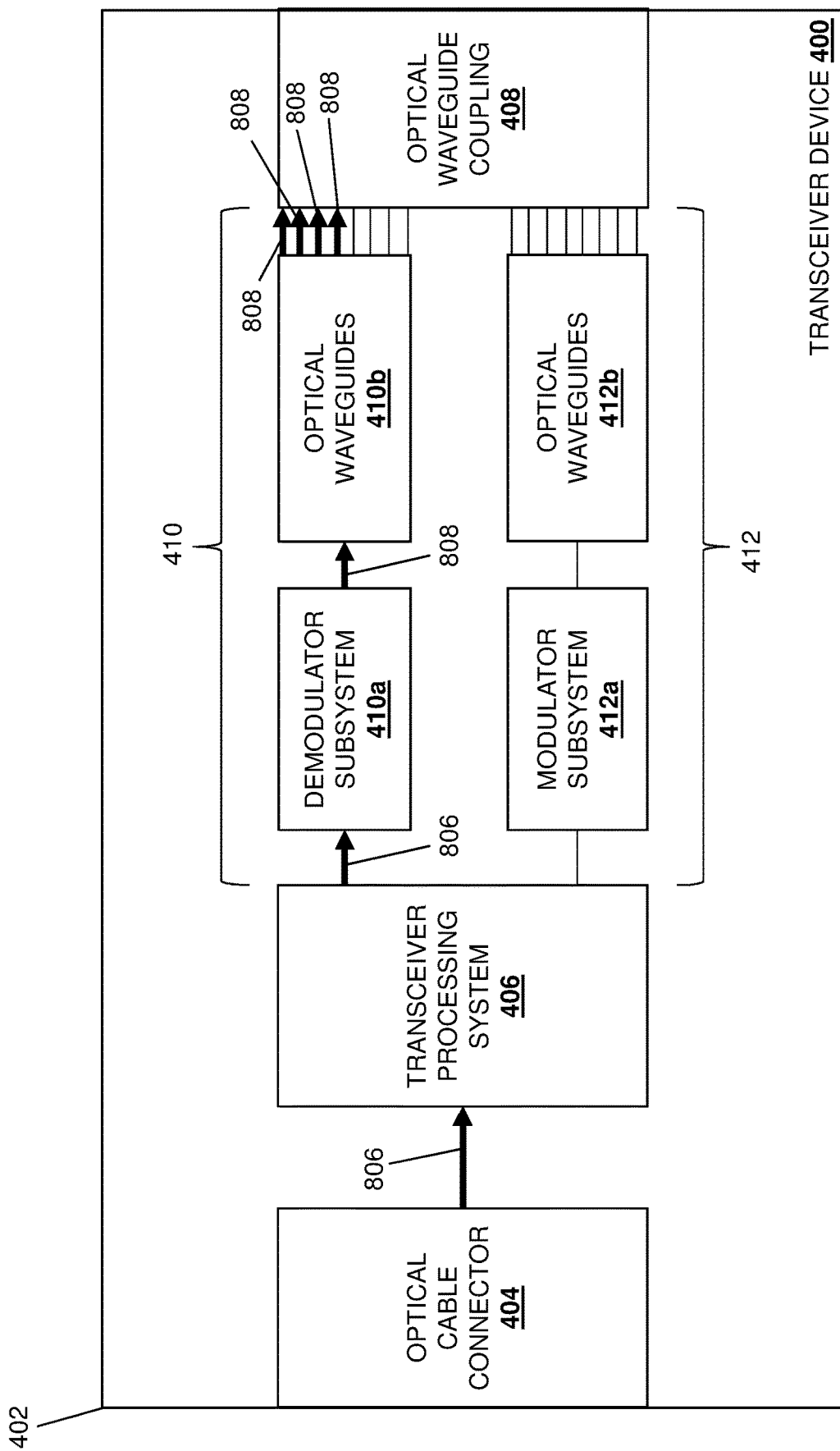
FIG. 8C is a schematic view illustrating an embodiment of the transceiver device of FIG. 4 operating during the method of FIG. 5.

With reference to FIG. 8C, in an embodiment of block 502b in which the switch device 202/300 is configured to receive data at data transmission speeds of 200 GbE, and thus data received by the transceiver device 400 at block 502b will have been transmitted at a data transmission speed of 200 GbE, the transceiver device 400 may perform data receiving operations 806 using the transceiver processing system 406 and the data receiving subsystem 410. For example, the data receiving operations 806 may include the transceiver processing system 406 receiving modulated data via the optical cable connector 404 and the cable coupled to the optical cable connector 404 (e.g., with that cable also coupled to the transceiver device 400/server device 204 or 206). The data receiving operations 806 may also include the transceiver processing system 406 providing the modulated data to the demodulator subsystem 410a.

Figure 9C:
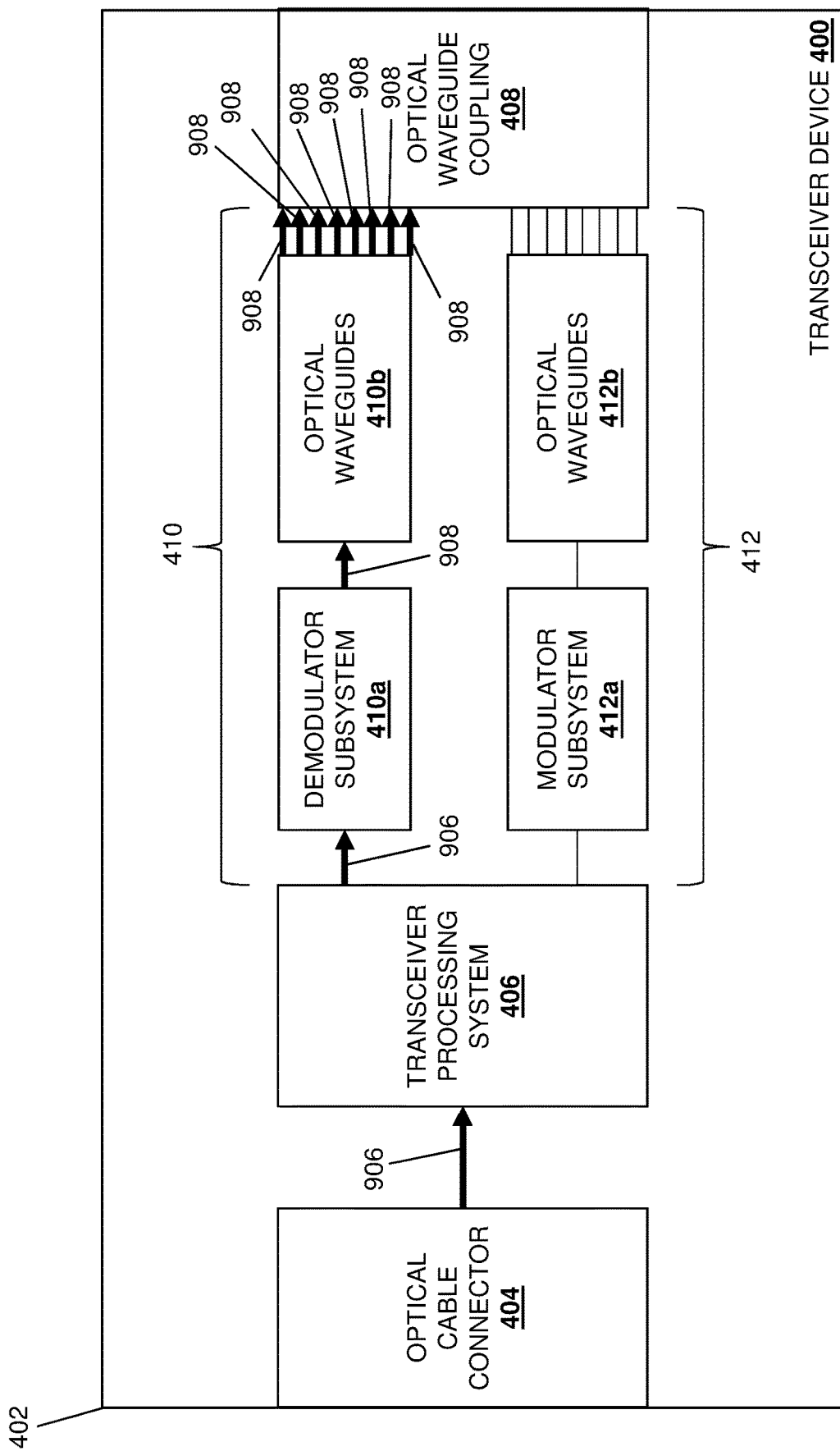
FIG. 9C is a schematic view illustrating an embodiment of the transceiver device of FIG. 4 operating during the method of FIG. 5.

With reference to FIG. 9C, in an embodiment of block 502b in which the switch device 202/300 is configured to receive data at data transmission speeds of 400 GbE, and thus data received by the transceiver device 400 at block 502b will have been transmitted at a data transmission speed of 400 GbE, the transceiver device 400 may perform data receiving operations 906 using the transceiver processing system 406 and the data receiving subsystem 410. For example, the data receiving operations 906 may include the transceiver processing system 406 receiving modulated data via the optical cable connector 404 and the cable coupled to the optical cable connector 404 (e.g., with that cable also coupled to the transceiver device 400/server device 204 or 206). The data receiving operations 906 may also include the transceiver processing system 406 providing the modulated data to the demodulator subsystem 410a.

The method 500 then proceeds to block 504b where the data receiving subsystem in the transceiver device transmits the second data via transceiver device optical waveguide(s) and a transceiver device optical waveguide coupling at the second data transmission speed. With reference back to FIG. 6C, in an embodiment of block 504b in which the switch device 202/300 is configured to receive data at a data transmission speed of 50 GbE or less, and thus data received by the transceiver device 400 at block 502b will have been transmitted at a data transmission speed of 50 GbE or less, the transceiver device 400 may perform data transmission operations 608 using the data receiver subsystem 410. For example, in the illustrated embodiment the data transmission operations 608 may include the demodulator subsystem 410a in the data receiving subsystem 410 demodulating the modulated data received from the transceiver processing system 406 at block 502b to provide data, and transmitting that data over one optical waveguide 410b and via the optical waveguide coupling 408 (as illustrated by the single bolded arrow extending between the optical waveguides 410b and the optical waveguide coupling 408 in FIG. 6C). As discussed above, each of the optical waveguides 410b may each be configured to transmit data at data transmission speeds of up to 50 GbE, and thus when data is received at data transmission speeds of 50 GbE or less, that data will be transmitted via a single optical waveguide 410b and the optical waveguide coupling 408 in the transceiver device 400. As such, only one of the eight available optical waveguides 410b in the transceiver device 400 will be utilized to transmit data to the switch device 202/300 when that data was received at data transmission speeds of 50 GbE or less.

With reference back to FIG. 7C, in an embodiment of block 504b in which the switch device 202/300 is configured to receive data at a data transmission speed of 100 GbE, and thus data received by the transceiver device 400 at block 502b will have been transmitted at a data transmission speed of 100 GbE, the transceiver device 400 may perform data transmission operations 708 using the data receiver subsystem 410. For example, in the illustrated embodiment the data transmission operations 708 may include the demodulator subsystem 410a in the data receiving subsystem 410 demodulating the modulated data received from the transceiver processing system 406 at block 502b to provide data, and transmitting that data over a pair of optical waveguides 410b and via the optical waveguide coupling 408 (as illustrated by the pair of bolded arrows extending between the optical waveguides 410b and the optical waveguide coupling 408 in FIG. 7C). As discussed above, each of the optical waveguides 410b may each be configured to transmit data at data transmission speeds of up to 50 GbE, and thus when data is received at data transmission speeds of 100 GbE, that data will be transmitted via a pair of optical waveguides 410b and the optical waveguide coupling 408 in the transceiver device 400. As such, only two of the eight available optical waveguides 410b in the transceiver device 400 will be utilized to transmit data to the switch device 202/300 when that data was received at data transmission speeds of 100 GbE.

With reference back to FIG. 8C, in an embodiment of block 504b in which the switch device 202/300 is configured to receive data at a data transmission speed of 200 GbE, and thus data received by the transceiver device 400 at block 502b will have been transmitted at a data transmission speed of 200 GbE, the transceiver device 400 may perform data transmission operations 808 using the data receiver subsystem 410. For example, in the illustrated embodiment the data transmission operations 808 may include the demodulator subsystem 410a in the data receiving subsystem 410 demodulating the modulated data received from the transceiver processing system 406 at block 502b to provide data, and transmitting that data over four optical waveguides 410b and via the optical waveguide coupling 408 (as illustrated by the four bolded arrows extending between the optical waveguides 410b and the optical waveguide coupling 408 in FIG. 8C). As discussed above, the optical waveguides 410b may each be configured to transmit data at data transmission speeds of up to 50 GbE, and thus when data is received at data transmission speeds of 200 GbE, that data will be transmitted via four optical waveguides 410b and the optical waveguide coupling 408 in the transceiver device 400. As such, only four of the eight available optical waveguides 410b in the transceiver device 400 will be utilized to transmit data to the switch device 202/300 when that data was received at data transmission speeds of 200 GbE.

With reference back to FIG. 9C, in an embodiment of block 504b in which the switch device 202/300 is configured to receive data at a data transmission speed of 400 GbE, and thus data received by the transceiver device 400 at block 502b will have been transmitted at a data transmission speed of 400 GbE, the transceiver device 400 may perform data transmission operations 908 using the data receiver subsystem 410. For example, in the illustrated embodiment the data transmission operations 908 may include the demodulator subsystem 410a in the data receiving subsystem 410 demodulating the modulated data received from the transceiver processing system 406 at block 502b to provide data, and transmitting that data over eight optical waveguides 410b and via the optical waveguide coupling 408 (as illustrated by the eight bolded arrows extending between the optical waveguides 410b and the optical waveguide coupling 408 in FIG. 9C). As discussed above, the optical waveguides 410b may each be configured to transmit data at data transmission speeds of up to 50 GbE, and thus when data is received at data transmission speeds of 400 GbE, that data will be transmitted via eight optical waveguides 410b and the optical waveguide coupling 408 in the transceiver device 400. As such, all eight available optical waveguides 410b in the transceiver device 400 will be utilized to transmit data to the switch device 202/300 when that data was received at data transmission speeds of 400 GbE.

Figure 6D:
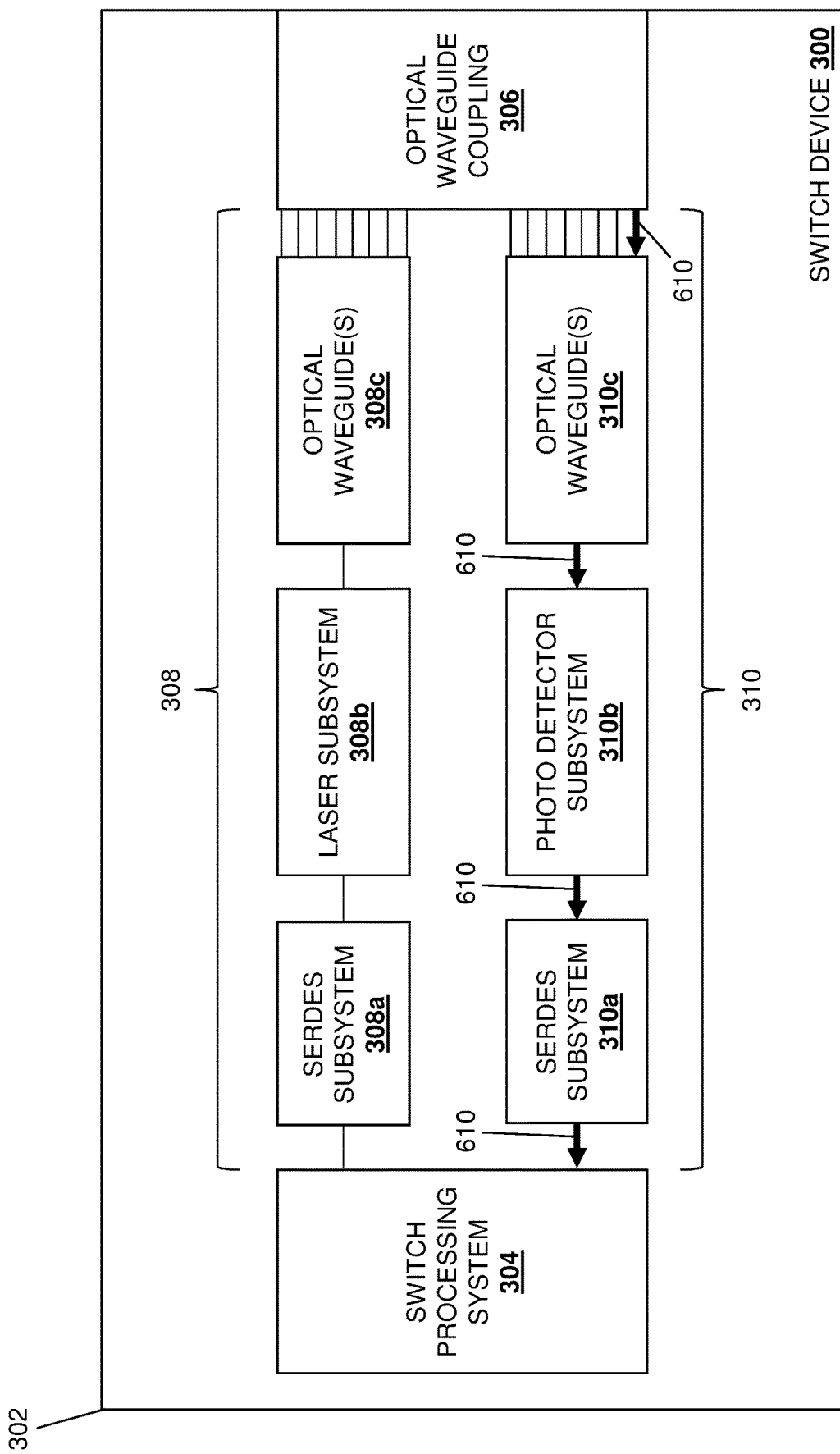
FIG. 6D is a schematic view illustrating an embodiment of the switch device of FIG. 3 operating during the method of FIG. 5.

The method 500 then proceeds to block 506b where the switch device receives the second data via the switch device optical waveguide coupling and the switch device optical waveguide(s) at the second data transmission speed. With reference to FIG. 6D, in an embodiment of block 506b in which the switch device 202/300 is configured to receive data at data transmission speeds of 50 GbE or less, the switch device 300 may perform data receiving operations 610 using the data receiving subsystem 310. For example, in the illustrated embodiment the data receiving operations 610 may include may include the data that was transmitted by the transceiver device 400 at block 504b being received via the optical waveguide coupling 306 and one optical waveguide 310c (as illustrated by the single bolded arrow extending between the optical waveguide coupling 306 and the optical waveguides 310c in FIG. 6D), and transmitted via the one optical waveguide 310c to the photo detector subsystem 310b in the data receiving subsystem 310.

As discussed above, each of the optical waveguides 310c/410b may be configured to transmit data at data transmission speeds of up to 50 GbE, and thus when the transceiver device 400 transmitted the data at block 504b at data transmission speeds of 50 GbE or less over the single optical waveguide 410b, that data will be received via a single optical waveguide 310c in the switch device 202/300 that is coupled to the single optical waveguide 410b in the transceiver device 400 (e.g., via the optical waveguide couplings 306 and 408). Thus, when the switch device 202/300 is configured to receive data at data transmission speeds of 50 GbE or less, only a single optical waveguide 310c is required. As such, while eight connections are illustrated in FIG. 6D between the optical waveguides 310c and the optical waveguide coupling 306, only a single optical waveguide 310c may be required in the switch device 202/300 when it is configured to receive data at data transmission speeds of 50 GbE or less. As illustrated, the data receiving operations 610 may include the photo detector subsystem 310b receiving the data (transmitted optically via the cable and transceiver device 400) from the single optical waveguide 410b, converting the optical data to electrical data, and transmitting the electrical data to the SERDES subsystem 310a. The SERDES subsystem 308a may receive the data from the photo detector subsystem 310b, and perform serializer/deserializer operations to transmit the data to the switch processing system 304, which may then perform any of a variety of switching operations on that data that would be apparent to one of skill in the art in possession of the present disclosure.

Figure 7D:
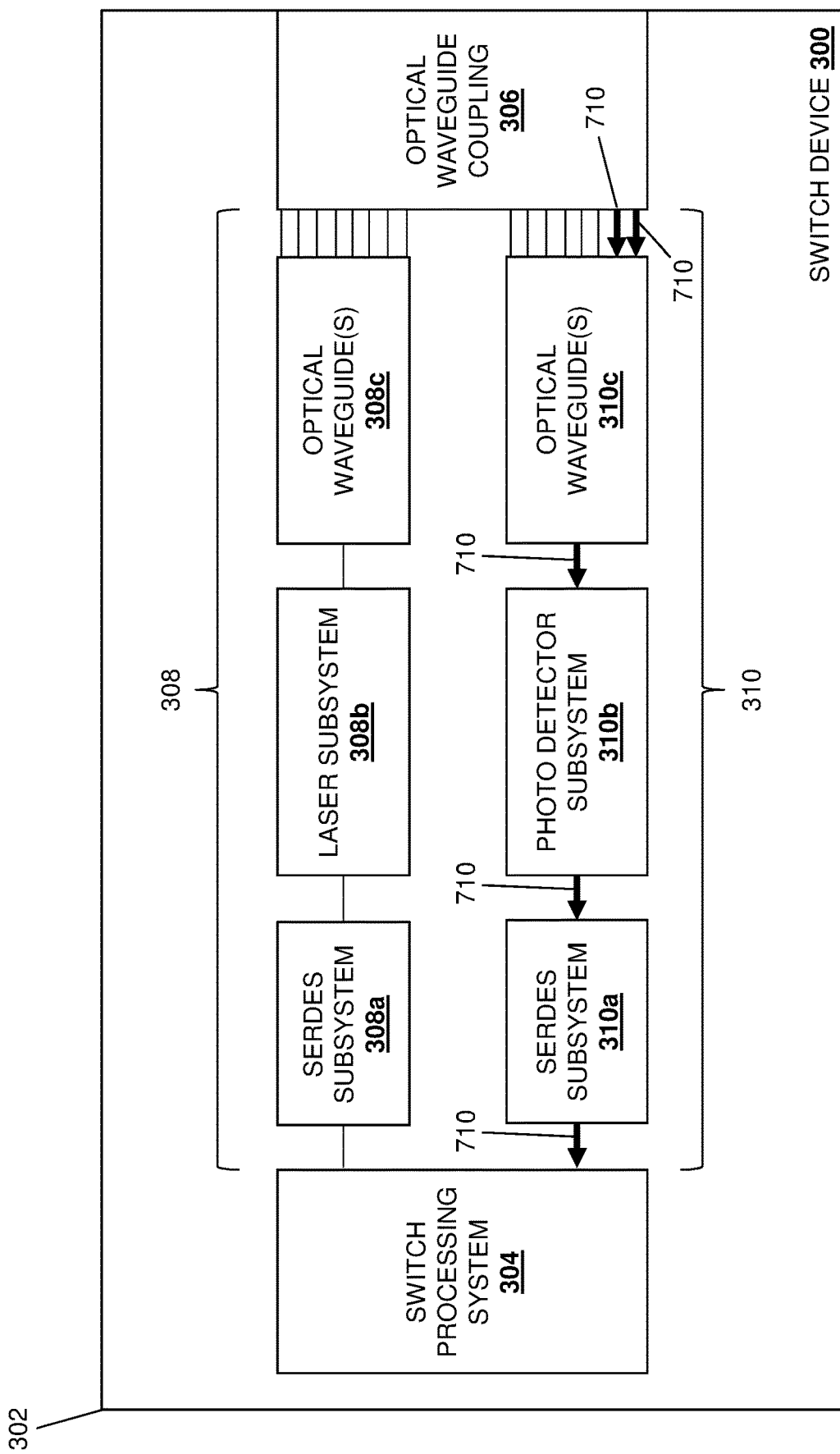
FIG. 7D is a schematic view illustrating an embodiment of the switch device of FIG. 3 operating during the method of FIG. 5.

With reference to FIG. 7D, in an embodiment of block 506b in which the switch device 202/300 is configured to receive data at data transmission speeds of 100 GbE, the switch device 300 may perform data receiving operations 710 using the data receiving subsystem 310. For example, in the illustrated embodiment the data receiving operations 710 may include the data that was transmitted by the transceiver device 400 at block 504b being received via the optical waveguide coupling 306 and a pair of optical waveguides 310c (as illustrated by the pair of bolded arrows extending between the optical waveguide coupling 306 and the optical waveguides 310c in FIG. 7D), and transmitted via the pair of optical waveguides 310c to the photo detector subsystem 310b in the data receiving subsystem 310.

As discussed above, each of the optical waveguides 310c/410b may be configured to transmit data at data transmission speeds of up to 50 GbE, and thus when the transceiver device 400 transmitted the data at block 504b at data transmission speeds of 100 GbE over the pair of optical waveguides 410b, that data will be received via the pair of optical waveguides 310c in the switch device 202/300 that are coupled to the pair of optical waveguides 410b in the transceiver device 400 (e.g., via the optical waveguide couplings 306 and 408). Thus, when the switch device 202/300 is configured to receive data at data transmission speeds of 100 GbE, only a pair of optical waveguides 310c are required. As such, while eight connections are illustrated in FIG. 7D between the optical waveguides 310c and the optical waveguide coupling 306, only a pair of optical waveguides 310c may be required in the switch device 202/300 when it is configured to receive data at data transmission speeds of 100 GbE. As illustrated, the data receiving operations 710 may include the photo detector subsystem 310b receiving the optical data (transmitted optically via the cable and transceiver device 400) from the pair of optical waveguides 410b, converting the optical data to electrical data, and transmitting the electrical data to the SERDES subsystem 310a. The SERDES subsystem 308a may receive the data from the photo detector subsystem 310b, and perform serializer/deserializer operations to transmit the data to the switch processing system 304, which may then perform any of a variety of switching operations on that data that would be apparent to one of skill in the art in possession of the present disclosure.

Figure 8D:
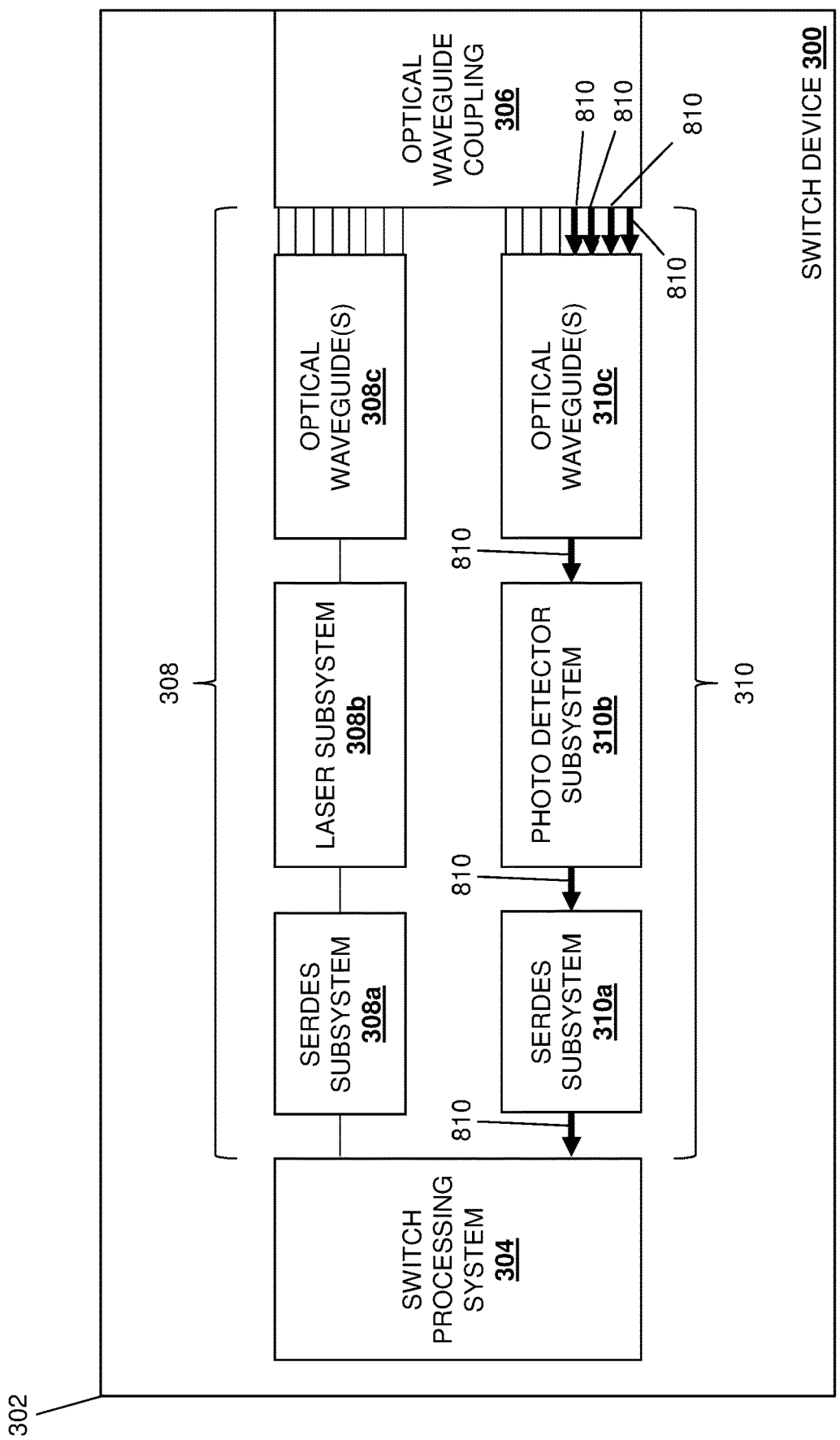
FIG. 8D is a schematic view illustrating an embodiment of the switch device of FIG. 3 operating during the method of FIG. 5.

With reference to FIG. 8D, in an embodiment of block 506b in which the switch device 202/300 is configured to receive data at data transmission speeds of 200 GbE, the switch device 300 may perform data receiving operations 810 using the data receiving subsystem 310. For example, in the illustrated embodiment the data receiving operations 810 may include the data that was transmitted by the transceiver device 400 at block 504b being received via the optical waveguide coupling 306 and four optical waveguides 310c (as illustrated by the four bolded arrows extending between the optical waveguide coupling 306 and the optical waveguides 310c in FIG. 8D), and transmitted via the four optical waveguides 310c to the photo detector subsystem 310b in the data receiving subsystem 310.

As discussed above, each of the optical waveguides 310c/410b may be configured to transmit data at data transmission speeds of up to 50 GbE, and thus when the transceiver device 400 transmitted the data at block 504b at data transmission speeds of 200 GbE over the four optical waveguides 410b, that data will be received via the four optical waveguides 310c in the switch device 202/300 that are coupled to the four optical waveguides 410b in the transceiver device 400 (e.g., via the optical waveguide couplings 306 and 408). Thus, when the switch device 202/300 is configured to receive data at data transmission speeds of 200 GbE, only four optical waveguides 310c are required. As such, while eight connections are illustrated in FIG. 8D between the optical waveguides 310c and the optical waveguide coupling 306, only four optical waveguides 310c may be required in the switch device 202/300 when it is configured to receive data at data transmission speeds of 200 GbE. As illustrated, the data receiving operations 810 may include the photo detector subsystem 310b receiving the optical data (transmitted optically via the cable and transceiver device 400) from the four optical waveguides 410b, converting the optical data to electrical data, and transmitting the electrical data to the SERDES subsystem 310a. The SERDES subsystem 308a may receive the data from the photo detector subsystem 310b, and perform serializer/deserializer operations to transmit the data to the switch processing system 304, which may then perform any of a variety of switching operations on that data that would be apparent to one of skill in the art in possession of the present disclosure.

Figure 9D:
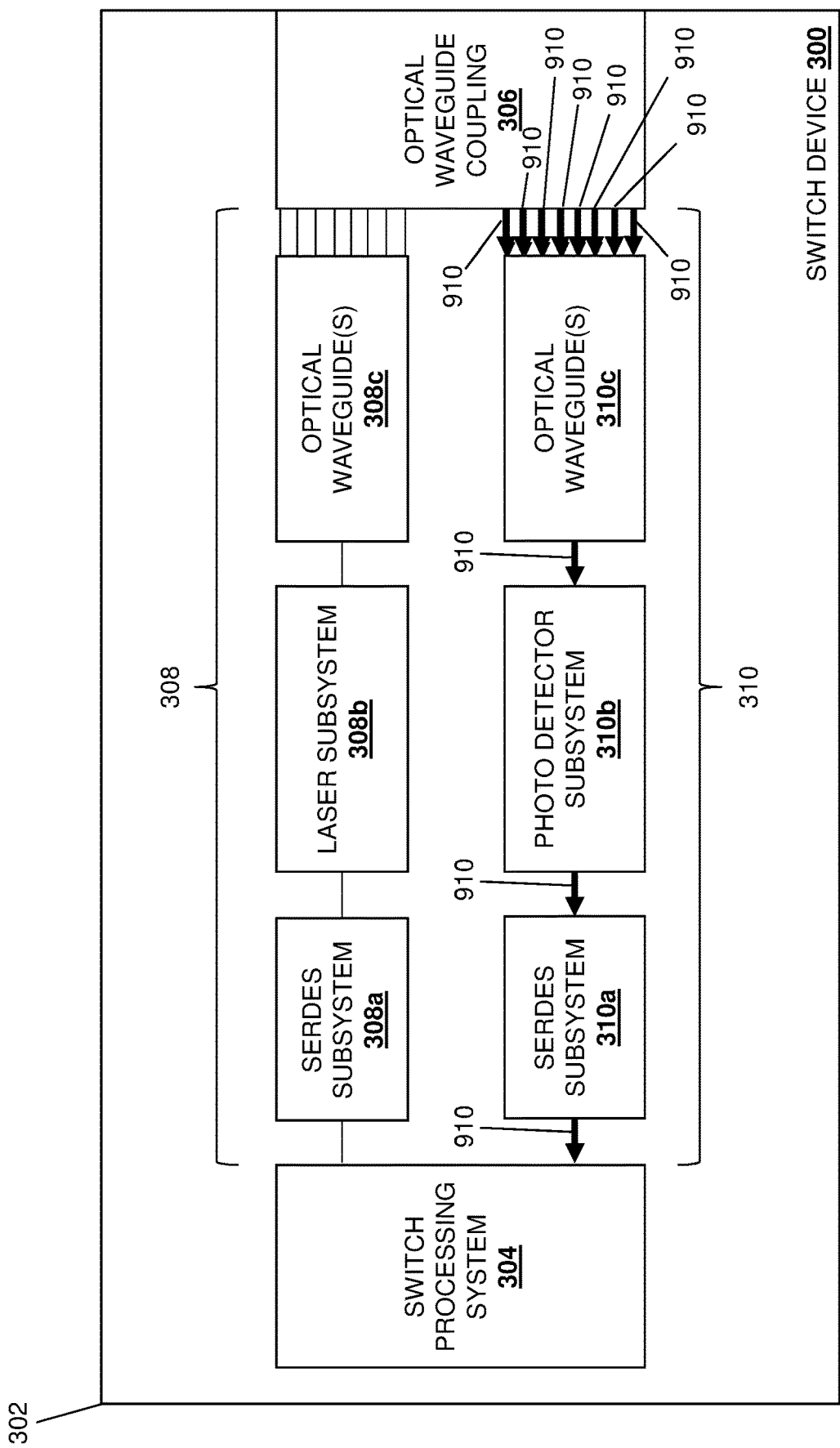
FIG. 9D is a schematic view illustrating an embodiment of the switch device of FIG. 3 operating during the method of FIG. 5.

With reference to FIG. 9D, in an embodiment of block 506b in which the switch device 202/300 is configured to receive data at data transmission speeds of 400 GbE, the switch device 300 may perform data receiving operations 910 using the data receiving subsystem 310. For example, in the illustrated embodiment the data receiving operations 910 may include the data that was transmitted by the transceiver device 400 at block 504b being received via the optical waveguide coupling 306 and eight optical waveguides 310c (as illustrated by the eight bolded arrows extending between the optical waveguide coupling 306 and the optical waveguides 310c in FIG. 9D), and transmitted via the eight optical waveguides 310c to the photo detector subsystem 310b in the data receiving subsystem 310.

As discussed above, each of the optical waveguides 310c/410b may be configured to transmit data at data transmission speeds of up to 50 GbE, and thus when the transceiver device 400 transmitted the data at block 504b at data transmission speeds of 400 GbE over the eight optical waveguides 410b, that data will be received via the eight optical waveguides 310c in the switch device 202/300 that are coupled to the eight optical waveguides 410b in the transceiver device 400 (e.g., via the optical waveguide couplings 306 and 408). Thus, when the switch device 202/300 is configured to receive data at data transmission speeds of 400 GbE, all eight optical waveguides 310c are required. As illustrated, the data receiving operations 910 may include the photo detector subsystem 310b receiving the optical data (transmitted optically via the cable and transceiver device 400) from the eight optical waveguides 410b, converting the optical data to electrical data, and transmitting the electrical data to the SERDES subsystem 310a. The SERDES subsystem 308a may receive the data from the photo detector subsystem 310b, and perform serializer/deserializer operations to transmit the data to the switch processing system 304, which may then perform any of a variety of switching operations on that data that would be apparent to one of skill in the art in possession of the present disclosure.

Thus, the transceiver device 400 may be connected to switch devices or server devices that are configured to receive data at different data transmission speeds, and the plurality of optical waveguides (e.g., eight in the embodiments discussed above) in the transceiver device 400 will be coupled to corresponding optical waveguide(s) in the switch devices or server devices that are utilized to support their configured data receiving speed (e.g., one optical waveguide utilized to support data receiving speeds of 50 GbE or less, a pair of optical waveguides utilized to support data receiving speeds of 100 GbE, four optical waveguides utilized to support data receiving speeds of 200 GbE, and eight optical waveguides utilized to support data receiving speeds of 400 GbE). As such, the same transceiver device may be utilized with different switch devices and server devices regardless of their configured data receiving speed, thus eliminating the issues associated with conventional transceiver devices that have static data transmission speed configurations. Furthermore, one of skill in the art in possession of the present disclosure will appreciate that switch devices may be configured to send and receive data at the same data transmission speed, so the "first data transmission speed" and the "second data transmission speed" in the method 500 described above may be the same data transmission speed.

Thus, systems and methods have been described that provide a multi-speed transceiver device that is configured to transmit and receive data at a variety of different data transmission speeds via one or more of a plurality of optical waveguides. For example, the multi-speed transceiver device of the present disclosure may include a chassis having an optical cable connector coupled to a transceiver processing system, and an optical waveguide coupling. A data receiving subsystem in the chassis couples the transceiver processing system to the optical waveguide coupling, includes data receiving optical waveguides, and transmits first data received from the transceiver processor to the optical waveguide coupling over a number of the data receiving optical waveguides that depends on a first data transmission speed at which the first data was received. A data transmission subsystem in the chassis couples the transceiver processing system to the optical waveguide coupling, includes data transmission optical waveguides, and receives second data via the optical waveguide coupling and over a number of the data transmission optical waveguides that depends on a second data transmission speed at which the second data was received, and then transmits that second data to the transceiver processing system. As such, the multi-speed transceiver device may be utilized with devices transmitting data at different data transmission speeds, eliminating many of the issues associated with conventional transceiver devices that have static data transmission speed configurations.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A multi-speed transceiver device, comprising:
   a chassis;
   an optical cable connector included on the chassis;

a transceiver processing system that is included in the chassis and that is coupled to the optical cable connector;
an optical waveguide coupling that is included on the chassis;
a data receiving subsystem that is included in the chassis and that is coupled to the transceiver processing system and the optical waveguide coupling, wherein the data receiving subsystem includes a plurality of data receiving optical waveguides and is configured to transmit first data received from the transceiver processing system to the optical waveguide coupling over a number of the plurality of data receiving optical waveguides that depends on a first data transmission speed at which the first data was received; and
a data transmission subsystem that is included in the chassis and that is coupled to the transceiver processing system and the optical waveguide coupling, wherein the data transmission subsystem includes a plurality of data transmission optical waveguides and is configured to receive second data via the optical waveguide coupling and over a number of the plurality of data transmission optical waveguides that depends on a second data transmission speed at which the second data was received, and transmit that second data to the transceiver processing system.

2. The system of claim 1, wherein the first data transmission speed is the same as the second data transmission speed.

3. The system of claim 1, wherein the data receiving subsystem includes:
a demodulator subsystem that is coupled to the transceiver processing system and the plurality of data receiving optical waveguides, wherein the demodulator subsystem is configured to:
receive modulated first data from the transceiver processing system;
demodulate the modulated first data to extract the first data; and
transmit the first data over the number of the plurality of receiving optical waveguides that depends on the first data transmission speed at which the first data was received.

4. The system of claim 1, wherein the data transmission subsystem includes:
a modulator subsystem that is coupled to the transceiver processing system and the plurality of data transmission optical waveguides, wherein the modulator subsystem is configured to:
receive the second data via the optical waveguide coupling and over the number of the plurality of data transmission optical waveguides that depends on the second data transmission speed at which the second data was received;
modulate the second data to produce modulated second data; and
transmit the modulated second data to the transceiver processing system.

5. The system of claim 1, wherein the cable connector is an optical cable connector, and wherein the transceiver processing system is configured to:
receive the first data via the optical cable connector and transmit the first data to the data receiving subsystem; and
receive the second data from the data transmission subsystem and transmit the second data via the optical cable connector.

6. The system of claim 1, wherein the plurality of data receiving optical waveguides include at least eight data receiving optical waveguides, and wherein the plurality of data transmission optical waveguides include at least eight data transmission optical waveguides.

7. An Information Handling System (IHS), comprising:
a first device that includes:
a first device optical waveguide coupling; and
a first device data transmission subsystem that is coupled to the first device optical waveguide coupling, wherein the first device data transmission subsystem includes a plurality of first device data transmission optical waveguides and is configured to transmit first data to the first device waveguide coupling over a number of the plurality of first device data transmission optical waveguides that depends on a first data transmission speed at which the first data is transmitted; and
a transceiver device that includes:
a transceiver device optical waveguide coupling that is connected to the first device optical waveguide coupling; and
a transceiver device data transmission subsystem that is coupled to the transceiver device optical waveguide coupling, wherein the transceiver device data transmission subsystem includes a plurality of transceiver device data transmission optical waveguides and is configured to receive the first data via the transceiver device optical waveguide coupling from the first device and over a number of the plurality of transceiver device data transmission optical waveguides that depends on the first data transmission speed at which the first data was received.

8. The IHS of claim 7, wherein the transceiver device data transmission subsystem includes:
a modulator subsystem that is coupled to the plurality of data transmission optical waveguides, wherein the modulator subsystem is configured to:
receive the first data via the transceiver device optical waveguide coupling from the first device and over the number of the plurality of transceiver device data transmission optical waveguides that depends on the first data transmission speed at which the first data was received;
modulate the first data to produce modulated first data; and
transmit the modulated first data to a second device.

9. The IHS of claim 7, wherein the transceiver device includes:
a transceiver device data receiving subsystem that is coupled to the transceiver device optical waveguide coupling, wherein the transceiver device data receiving subsystem includes a plurality of transceiver device data receiving optical waveguides and is configured to transmit second data received from a second device to the transceiver device optical waveguide coupling over a number of the plurality of transceiver device data receiving optical waveguides that depends on a second data transmission speed at which the second data was received, and
wherein the first device includes:
a first device data receiving subsystem that is coupled to the first device optical waveguide coupling, wherein the first device data receiving subsystem includes a plurality of first device data receiving optical waveguides and is configured to receive the second data via the first device optical waveguide coupling from the transceiver device and over a number of the plurality of first device data receiving optical waveguides that depends on the second data transmission speed at which the second data was received.

10. The IHS of claim 9, wherein the transceiver device data receiving subsystem includes:
a demodulator subsystem that is coupled to the plurality of transceiver device data receiving optical waveguides, wherein the demodulator subsystem is configured to:
receive modulated second data from the second device;
demodulate the modulated second data to extract the second data; and
transmit the second data over the number of the plurality of transceiver device receiving optical waveguides that depends on the second data transmission speed at which the second data was received.

11. The IHS of claim 9, wherein the transceiver device includes:
an optical cable connector; and
a transceiver processing system that is coupled to the optical cable connector, the transceiver device data receiving subsystem, and the transceiver device data transmission subsystem, and wherein the transceiver processing system is configured to:
receive the first data from the transceiver device data transmission subsystem and transmit the first data via the optical cable connector to the second device; and
receive the second data via the optical cable connector and transmit the first data to the transceiver device data receiving subsystem.

12. The IHS of claim 7, wherein the plurality of first device data transmission optical waveguides include at least eight first device data transmission optical waveguides, and wherein the plurality of transceiver device data transmission optical waveguides include at least eight transceiver device data transmission optical waveguides.

13. The IHS of claim 7, wherein the first device is a switch device.

14. A method for transmitting data using a multi-speed transceiver device, comprising:
receiving, by a transceiver device via a cable connector that is included on the transceiver device, first data;
transmitting, by a data receiving subsystem that is included in the transceiver device and that is coupled to the cable connector and an optical waveguide coupling that is included on the transceiver device, the first data to the optical waveguide coupling over a number of a plurality of data receiving optical waveguides that depends on a first data transmission speed at which the first data was received;
receiving, by a data transmission subsystem that is included in the transceiver device and that is coupled to the cable connector and the optical waveguide coupling, second data via the optical waveguide coupling and over a number of a plurality of data transmission optical waveguides that depends on a second data transmission speed at which the second data was received; and
transmitting, by the data transmission subsystem, the second data via the cable connector.

15. The method of claim 14, wherein the first data transmission speed is the same as the second data transmission speed.

16. The method of claim 14, further comprising:
receiving, by a demodulator subsystem that is included in the data receiving subsystem, modulated first data;
demodulating, by the demodulator subsystem, the modulated first data to extract the first data; and
transmitting, by the demodulator subsystem, the first data over the number of the plurality of receiving optical waveguides that depends on the first data transmission speed at which the first data was received.

17. The method of claim 14, further comprising:
receiving, by a modulator subsystem that is included in the data transmission subsystem, the second data via the optical waveguide coupling and over the number of the plurality of data transmission optical waveguides that depends on the second data transmission speed at which the second data was received;
modulating, by the modulator subsystem, the second data to produce modulated second data; and
transmitting, by the modulator subsystem, the modulated second data via the cable connector.

18. The method of claim 14, wherein the cable connector is an optical cable connector, and wherein the method further includes:
receiving, by a transceiver processing system that is included in the transceiver device and that is coupled to the optical cable connector and the data receiving subsystem, the first data via the optical cable connector and transmitting the first data to the data receiving subsystem; and
receiving, by the transceiver processing system, the second data from the data transmission subsystem and transmitting the second data via the optical cable connector.

19. The method of claim 14, wherein the plurality of data receiving optical waveguides include at least eight data receiving optical waveguides, and wherein the plurality of data transmission optical waveguides include at least eight data transmission optical waveguides.

20. The method of claim 14, wherein a switch device is connected to the optical waveguide coupling, and wherein a server device is coupled to the cable connector via a cable.

* * * * *